(12) United States Patent
Hsu et al.

(10) Patent No.: US 7,457,815 B2
(45) Date of Patent: Nov. 25, 2008

(54) METHOD AND APPARATUS FOR AUTOMATICALLY PROVIDING NETWORK SERVICES

(75) Inventors: Karl Hsu, San Jose, CA (US); Francois Jouaux, Woodside, CA (US); Ernest Kim, Redwood City, CA (US); Ron Lue-Sang, Sunnyvale, CA (US); Melissa Turner, Burlingame, CA (US); Andreas Wendker, San Jose, CA (US)

(73) Assignee: Apple Inc., Cupertino, CA (US)

( * ) Notice: Subject to any disclaimer, the term of this patent is extended or adjusted under 35 U.S.C. 154(b) by 267 days.

(21) Appl. No.: 10/401,121

(22) Filed: Mar. 27, 2003

(65) Prior Publication Data

US 2004/0193635 A1   Sep. 30, 2004

(51) Int. Cl.
*G06F 7/00* (2006.01)
(52) U.S. Cl. ..................................... 707/102
(58) Field of Classification Search .............. 707/1, 707/100
See application file for complete search history.

(56) References Cited

U.S. PATENT DOCUMENTS 6,738,077 B1   5/2004   Wendker et al.

2001/0009033 A1*   7/2001   Morisaki et al. ............... 717/1
2003/0041065 A1*   2/2003   Lucovsky et al. ............. 707/10
2004/0002958 A1*   1/2004   Seshadri et al. ................ 707/3

OTHER PUBLICATIONS

Ceri et al., IEEE Internet Computing, Aug. 2002, pp. 20-30.*
Ceri et al., Computer Networks, 2000, pp. 137-157.*
Microsoft Corporation, Microsoft Computer Dictionary, 5th Edition, 2002, pp. 487 and 576.*
Ceri et al., Proceedings of the 25th VLDB Conference, Edingburg, Scotland, pp. 615-626, 1999.*
Ramakrishnan, R., Database Management Systems, WCB/McGraw-Hill. pp. 25-32, 1998.*
Sakellaris et al., 2001 Proceedings of the 23rd Annual EMBS International Conference Oct. 25-28, Istanbul Turkey, pp. 3630-3633.*
U.S. Appl. No. 10/824,251, filed Apr. 13, 2004, Wendker et al.

* cited by examiner

*Primary Examiner*—Cheyne D Ly
(74) *Attorney, Agent, or Firm*—Van Pelt, Yi & James LLP

(57) ABSTRACT

An embodiment of the invention is directed to a method and apparatus for automatically providing network services in a way that improves upon the prior art. Systems implementing aspects of the invention can, for instance, provide developers with a mechanism for creating Web Services without having to write low-level SOAP, XML, or WSDL code. The system utilizes a rule-based approach to provide a mechanism for dynamically reconfiguring the system with requiring redeployment of the entire system.

32 Claims, 18 Drawing Sheets

METHOD AND APPARATUS FOR AUTOMATICALLY PROVIDING NETWORK SERVICES

FIELD OF THE INVENTION

The invention relates to the field of computer software. More particularly, the invention is directed to computer software configured to enable systems to provide network services.

BACKGROUND

Computer networks provide users with an efficient way to share information. It is commonplace, for example, for users to exchange data using collaborative applications such as email or access stored information using other data retrieval applications. One of the more widely used data retrieval applications is referred to as a web browser. Web browsers are typically configured to obtain data from a World Wide Web of interconnected server computers (hereinafter the Web) using a number of standardized data communication protocols. The Web utilizes a client-server architecture made up of multiple client computers executing a Web Browser application that handles connecting to and retrieving information from one or more server applications.

Once the requested information is retrieved, the Web Browser application parses the obtained information and displays aspects of that information to the user. For example, a user may utilize a Web Browser to access a web site that provides information served in the form of Hyper-Text Markup Language (HTML) or in Extended Markup Language (XML). The portions of HTML or XML information that relate to components intended for display are presented to the user via a standard computer display.

The server computer(s) executing at the web site are configured to handle requests for information by executing a suite of applications. One such a web server application handles requests to transfer data (e.g., HTTP requests), whereas Common Gateway Interface (CGI) programs handle access to data stored in a database and can generate HTML documents that are then transmitted to the requesting user. A web server will typically invoke a CGI program when the system receives a request from a client for a particular script. Practical Extension Reporting Language (PERL) scripts and other server side scripting languages are examples of the type of scripts often handled using CGI. Although such scripts can fulfill many system needs, a problem with using CGI scripts is that the scripts become increasingly difficult to create when utilized to access complex data sources or dynamically provide information.

Due in large part to the complexity involved when using the scripting approach, those of ordinary skill in the art often prefer to use Application Servers in lieu of writing complex scripts. Application Servers have far more flexibility and can provide an effective mechanism for accessing databases and generating output documents using a framework that enables developers to add new functionality and handle tasks such as object persistence, session management, and fail-over protection. However, programming an interface to an Application Server is made difficult by the fact that most systems do not have a tightly constrained set of end-users. Since it is increasingly common for businesses to provide business-to-business services involving multiple types of end-users, there is a need for a more flexible approach to building Application Server interfaces.

When developing server applications for electronic data providers, developers face several challenges. The end-users of such systems are generally not pre-defined. Adequately serving the needs of these users requires that the functions implemented to serve the data made available by the system be modified, or new functions added every time the data representation relating to the served data is modified or new data content added. To minimize the cost of adding new functionality or modifying existing ones, an efficient architecture for interfacing with an Application Server or some other data source is needed. It would, for example, be highly desirable if developers could reuse existing program code, minimize the number of locations where the source code must be altered, and prevent alterations in some parts of the code that affect other functions if such effect is not intentional.

A breed of Web application called Web Services, provides a way to resolve some of the problems and accomplish some of the goals stated above. Web Services are self-contained, self-describing, modular applications that can be published, located, and invoked across the Web. Web Services perform functions, which can be anything from simple requests to complicated business processes. Once a Web Service is deployed, other applications (and other Web services) can discover and invoke the deployed service.

Viewed from an application architecture perspective, Web Services provide a method that enables programmatic access to a service which is then implemented by other kinds of software (e.g., middleware). Access is achieved through the use of a listener and an interface for exposing operations supported by a business logic implemented by a traditional middleware platform. The Web Service architecture segments the services it provides into discrete functional components generally destined for use by other server-side software (e.g. CGI programs). The component-based model involves blocks of software program code, which programmers may reuse to extend the system's capabilities. To exchange data between servers associated with different business entities, Application Servers at each of the different business entities communicate using mutually recognizable data communication protocols. An overview of the various protocols and components of the Web Services platform is helpful for purposes of understanding how the architecture is adapted to provide various services.

The basic platform upon which Web Services are based utilizes eXtensible Markup Language (XML), plus Hyper-Text Transport Protocol (HTTP). HTTP is a ubiquitous protocol that acts as the basic mechanism for transporting data across the Web. XML provides a metalanguage for developers to write specialized languages to express complex interactions between clients and services or between components of a service. At the server level the XML data acts as a message that gets converted to a middleware request and the results converted back to XML. Platform support services, such as discovery, transactions, security, authentication, etc . . . are provided by other services such as SOAP and the Web Services Definition Language (WSDL). Thus, a fully functioning Web Services platform can be thought of as XML+HTTP+SOAP+WSDL+Universal Description, Discovery and Integration Service (UDDI). At higher levels, one might also add technologies such as XAML, XLANG, XKMS, and XFS, although such services are not universally accepted as a mandatory part of the Web Services platform.

Even though some of the protocols have overlapping functionality, each protocol is generally used for a specific purpose. SOAP, for instance, provides remote invocation, UDDI acts as a kind of trader/directory service, WSDL enables the system to express service characteristics, XLANG/XAML provides transaction support for complex web transactions involving multiple web services, and XKMS supports authentication and registration.

SOAP as it is understood by those of ordinary skill in the art is a protocol that defines a uniform way of passing XML-encoded data between computers. SOAP also defines a way to perform Remote Procedure Calls (RPCs) using HTTP as the underlying communication protocol. For example, SOAP provides a framework for describing data using XML to transfer data between computers using existing network infrastructures.

UDDI provides a mechanism for client computers to dynamically locate other web services. This enables business using a UDDI interface, to dynamically connect to services provided by other businesses. A UDDI registry can be thought of as a lookup service for business applications. A UDDI registry has two kinds of clients: businesses that want to offer a service (and its usage interfaces), and clients who want to obtain and use the offered service. UDDI is layered over SOAP and assumes that requests and responses are UDDI objects sent as SOAP messages.

WSDL provides a way for service providers to describe the basic format of Web Service requests over different protocols or encodings. WSDL is used to describe what a Web Service can do, where it resides, and how to invoke it. WSDL typically assumes SOAP/HTTP/MIME are to provide the remote object invocation mechanism. UDDI registries describe numerous aspects of Web Services, including the binding details of the service. Thus, WSDL fits into the subset of a UDDI service description.

WSDL defines services as collections of network endpoints or ports. In WSDL the abstract definition of endpoints and messages is separated from the network deployment or data format binding information. This allows the reuse of abstract definitions of messages (e.g., descriptions of the data being exchanged and collections of operations such as port types). The protocol and data format information relating to a particular port type constitutes a reusable binding. A port is defined by associating a network address with a reusable binding. Each collection of ports is what defines a service. A WSDL document typically defines a network service using the following elements:

Types—a container for data type definitions using some type system (such as XSD).

Message—an abstract, typed definition of the data being communicated.

Operation—an abstract description of an action supported by the service.

Port Type—an abstract set of operations supported by one or more endpoints.

Binding—a concrete protocol and data format specification for a particular port type.

Port—a single endpoint defined as a combination of a binding and a network address.

Service—a collection of related endpoints.

So, put simply, WSDL is a template for how services can be described and used by client computers.

A limitation in using these existing technologies to provide Web Services is that developers must manually write code to access data sources, provide functions called by clients, and retrieve or modify the data in the data source. This is a laborious process. When the data source is modified (e.g. by modifying a database schema), the developer is required to manually modify the source code for any Web Services affected by alterations to the data source. This requires that the developer have an intimate level of knowledge about the source code structure. For the companies that need to maintain such systems, this process is costly and particularly so, when the developer doing the maintenance is different from the one who performed the initial development. Moreover, each time there is a need to modify the database schema, the developer is required to modify many parts of the source code and propagate each of these changes to the clients that interface with the system. When an operation is to be added or modified, all affected services with which the operation (or operation type) is associated may require modification.

To reduce the development and deployment time, there is a need for a method and framework that assists developers and other users with the process of providing network services (e.g. web services) to end-users and facilitates the development and deployment of such network services.

SUMMARY OF THE INVENTION

Figure 1:
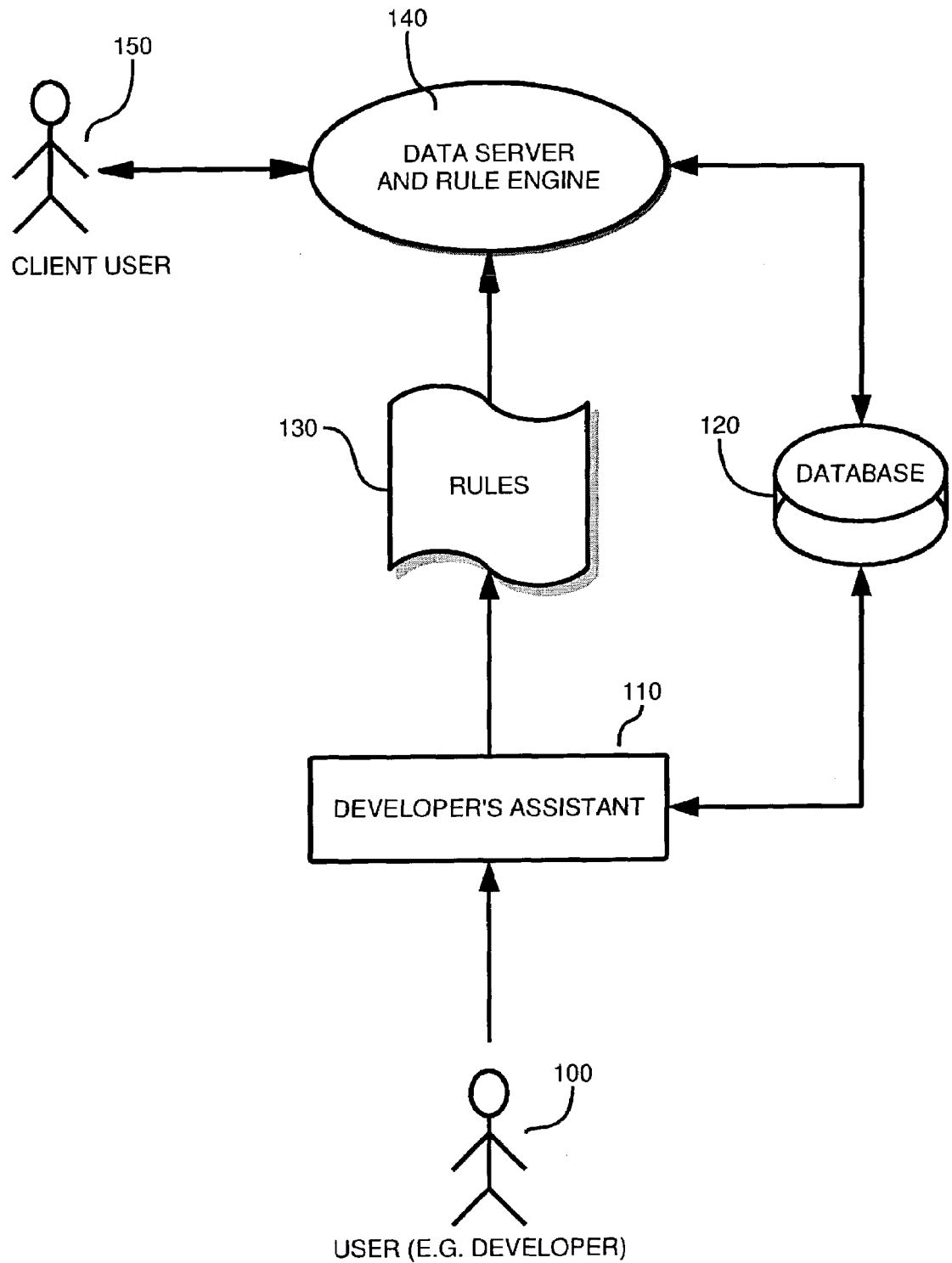
FIG. 1 depicts an architecture for enabling systems to provide web services in accordance with one or more embodiments of the invention.

An embodiment of the invention is directed to a method and apparatus for automatically providing network services in a way that improves upon the prior art. Systems implementing aspects of the invention can, for instance, provide developers with a mechanism for creating Web Services without having to write low-level SOAP, XML, or WSDL code. The system utilizes a rule-based approach that enables administrators and other users to dynamically adjust the system to include or exclude certain network services without having to engage in a complex redeployment effort.

The term network services as it is utilized herein, means the provision of a requested service between two or more parties using a client-server architecture to communicate data relating to the requested service. Typically, client computers request services from a server computer. The server is configured to dynamically provide the requested service by interfacing with one or more rules and data sources to obtain the data needed to perform the requested service.

A type of network service referred to as a Web Service is an example of a widely used network services. Web Services are supported by several standards for posting requests between clients and servers, and for encoding streams of data/objects. In one embodiment of the invention, requests and responses are posted between clients and servers using HTTP, and data messages relating to the provision of the requested service are encoded using SOAP. In such instances, these Web Services are supported using the WSDL to describe XML data objects.

Systems implementing one or more aspects of the invention utilize a highly modularized architecture. These modules are built around a rule engine that can infer most aspects of the system's behavior.

At the receiving end of the system, the requests are analyzed to check whether a request is destined for a network service (e.g., a Web Service). When the system receives a request for a Web Service, the system parses the message contained in the request under the supervision of the rule engine which can determine: the name of the Web Service, the operations necessary to respond to the request, and the arguments that allow the operations to execute and generate a response.

The system is capable of invoking the rule engine at any step of the processing and can evaluate request values on invocation. This ability provides administrators or users with a mechanism for dynamically reconfiguring the system with requiring redeployment of the entire system. Thus, an embodiment of the invention allows updates or changes to the system without requiring a start and stop of the system.

One aspect of the invention relates to implementing the capability to generate rules to govern such processing. Embodiments of the invention include an assistance tool that enables developers to specify the data schema of one or more data sources, the names of Web Services to be implemented, and other parameters relating to the Web Service such as properties and configuration parameters. In addition, the assistance tool, or simply the network services assistant, is capable of reverse engineering the schema and including the schema information into the web services definitions. The developer is also able, using the network services assistant, to manually add functionality to the system by entering specific rules. Once the network services assistant obtains the data schema and a set of configuration parameters the network services assistant generates a set of rules utilized by the rule engine at run-time. These rules direct the network services assistant to execute the proper component in order to handle a Web Services request.

The architecture implemented by one or more embodiments of the invention improves upon current systems in that it allows for greater control over the handling of inputs, processing and the generation of outputs during the provision of network services. Furthermore, by concentrating the control mechanism in a rule system, the architecture allows a developer to drastically change the system's behavior simply modifying rules, without requiring alteration of the source code modules associated with each network service.

DETAILED DESCRIPTION

Embodiments of the invention are directed to an improved method and apparatus for automatically providing network services. In the following description numerous specific details are set forth in order to provide a more thorough understanding of the invention. In some instances, well-known features have not been described in detail so as not to obscure certain aspects of the invention. It will be apparent, however, to an artisan of ordinary skill, that it is possible to practice the present invention without these specific details or by using well-know techniques, equivalents or alternatives to the specific examples given. As such, this detailed description of preferred and alternative embodiments should not be construed to limit the scope or breadth of the present invention. The claims and the full scope of any equivalents are what define the meets and bounds of the invention. Moreover, the reader should note that the invention described herein leverages technologies described in U.S. patent application Ser. No. 09/618,390 entitled "Dynamic Generation and Automated Distribution of User Interface from Database model" (filed on Jul. $18^{th}$, 2000) and incorporated herein by reference.

Terminology

Throughout the following disclosure, the term user refers to a person using a computer application and/or to one or more automatic processes. The automatic processes may include a computer program executing locally or on a remote computer, and may be triggered to communicate with embodiments of the invention following an event. Usage of the term client is without distinction as to whether the client is a user's application, a client machine or another server.

The term server is used to refer to any functional entity that provides services to a requestor. Thus, the term server can refer to a set of one or more physical machines or software executing on one or more machines. It should be clear to a person of ordinary skill in the art of computer programming that the term machine may refer to the physical hardware itself, or to a virtual machine such as a JAVA Virtual Machine (JVM), or even to separate virtual machines running different Operating Systems on the same physical machine and sharing that machine's computing resources.

It should be assumed that references made to client and server connections, or even generalized network connections, do not necessarily involve the user of a physical network such as an Ethernet network. Clients and servers may reside on the same machine and thus such connections can be local to one machine. This is the case, for example, on web sites running on a supercomputer. In the latter case, both web servers (e.g. Apache™ Web Server) and one or more Application Servers may execute within the same physical machine or on different virtual machines. The network connecting the virtual machines is in this case a virtual network. Embodiments of the invention are capable of running on such virtual networks.

The term data source refers to any mechanism or protocol for storing and retrieving computer data files. In its simplest form, a data source is a flat file residing on a file system. However, an electronic mail server, or a directory services server (e.g., an Lightweight Access Directory Protocol, etc . . . ), a database, or any other type of data repository can all function as data sources. Thus, references to the term database are interchangeable with the term data source. In the case of relational databases, a schema is conventionally used (e.g. star schema) to refer to the structure/organization of data in the relational database. Therefore, throughout this disclosure references to a database schema should be viewed as referring to the general data structure or organization that distinctly characterizes the data source in question (e.g. electronic mail server or directory services server). Moreover, the term developer as used herein is not limited to those with computer programming skills, but means any computer user or person regardless of the level of technical skill associated with that person.

The invention is implemented as a computer program based on a modularized architecture as will be detailed below. The system is designed to implement each component as a part of a large infrastructure (e.g. within an Application Server) or as a plug-in or applet embedded within, or interfaced with third party applications.

High-Level System Overview

FIG. 1 is a block diagram depicting an architecture for enabling systems to provide network services such as Web Services. When client 150 issues a request to a system implementing the invention, application server 140 initially handles the request by performing multiple checks to determine the validity and/or type of the request being made. Application server 140 contains one or more components for handling these requests and may, for instance, utilize these components to determine what object type to map a particular request.

Application server 140 is configured to have the ability to check one or more rules associated with the request against rule store 130. Rule store 130 provides a rule set for accessing, manipulating and/or serving data from a data source such as database 120. Developer 100 defines the rule set contained within rule store 130 and may, for instance, manually input rules and/or utilize the network services assistant 110 described herein to construct rules for accessing data in one or more data sources (e.g., database 120) and providing network services relating to that data.

The network services assistant allows a user to easily develop server-side services and publish those services to a client-side application. For example, when a service is created and a system implementing one or more aspects of the invention adds operations relating to that service, the service provider can publish a document containing a Uniform Resource Locator configured to enable the client to automatically connect back to the proper service. Also, in the architecture provided by the invention, simply changing the rules can easily change a system's behavior.

Figure 2:
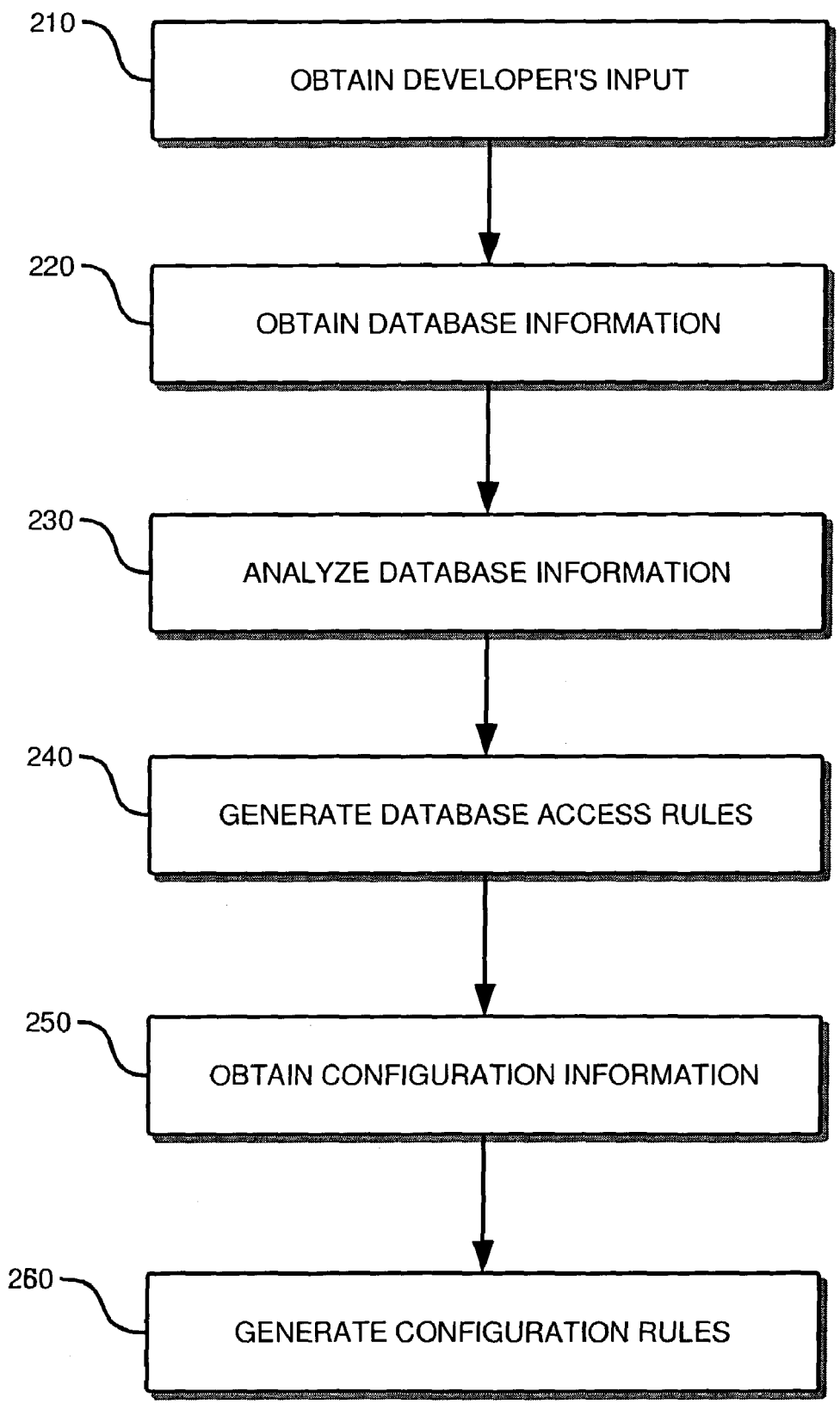
FIG. 2 illustrates the steps involved in developing and serving network services in accordance with one or more embodiments of the invention.

FIG. 2 illustrates the steps for developing and serving network services in accordance with one or more embodiments of the invention. At step 210, a system implementing the invention receives a developer's input. In the large majority of cases, but not all cases, a developer through the use of the network services assistant selects one or more data sources (e.g. relational databases, Lightweight Directory Access, Electronic mail systems, etc . . . ) and inputs one or more parameters relating to the selected data source. Some examples of such parameters include data defining subsets within the data source, the creation of aliases, constraints on a particular data selection, or data used to classify and define a type of data within the data source.

At step 220 the system obtains information about the data source. This information describes the structure and organization of the data in the data source. In the case of a relational database, the information is a relational schema that describes how data fields are organized in the database tables and how tables are linked to each other in the database. In select embodiments of the invention the system obtains the relational database schema via a flat file or any other data source. The system is also capable of reverse engineering a relational database to generate a description for the database. At step 220, a system implementing the invention may use one or more database connectivity interfaces (e.g. JAVA Database Connectivity "JDBC" or Open Database Connectivity "ODBC") to connect to a relational database and obtain an appropriate database schema.

The system can analyze the data source information to determine the data types (e.g., step 230) and may also determine the hierarchy of links between data fields and the properties and the operation types associated with those data fields. In some instances, this determination involves utilizing the relational database schema to ascertain which fields certain users may alter. Such information provides a mechanism for defining privilege levels within the data source. At step 240, the system generates rules for accessing the database. These rules define what operations can be performed upon the data source and may, for instance, define what type of information is in the database, how to obtain certain data within that database and what users are authorized to access that data.

At step 250, the system obtains a set of configuration rules that function at a layer above the rules for accessing the database. These configuration rules define a set of further constraints for interacting with the data source. In one or more embodiments of the invention, this latter step includes obtaining input from a developer through a specialized tool for generating such configuration rules (e.g., the network services assistant). The system can also obtain configuration information from other sources of data such as flat files, computer programs, or LDAP servers. Once the system obtains input defining the configuration rules, the system can generate a set of configuration rules (see e.g., step 260) that determine the system's behavior at runtime. Configuration rules define, for example, whether a network service is to be made accessible to certain users and can provide a way to control the level of accessibility to operations associated with each network service.

Network Services Assistant

Embodiments of the invention utilize a network services assistant configured to assist developers with the creation of the source code required to provide network services to requesting users. The network services assistant may, for instance, allow a developer to view the data schema, determine what networks services are available, and implement those services by configuring the operations and other properties associated with each service. The network services assistant may independently perform one or more aspects of the functionality describe herein. In some case, for example, the term network services assistant and system are interchangeable in that the network services assistant may, but is not required to, perform all or only some of the functions described as being performed by the network services assistant. Thus, the reader should note that the system itself or other software modules independent of the system can also perform the functions described as being performed by the network services assistant.

A. Obtaining a Data Source Schema

Figure 3:
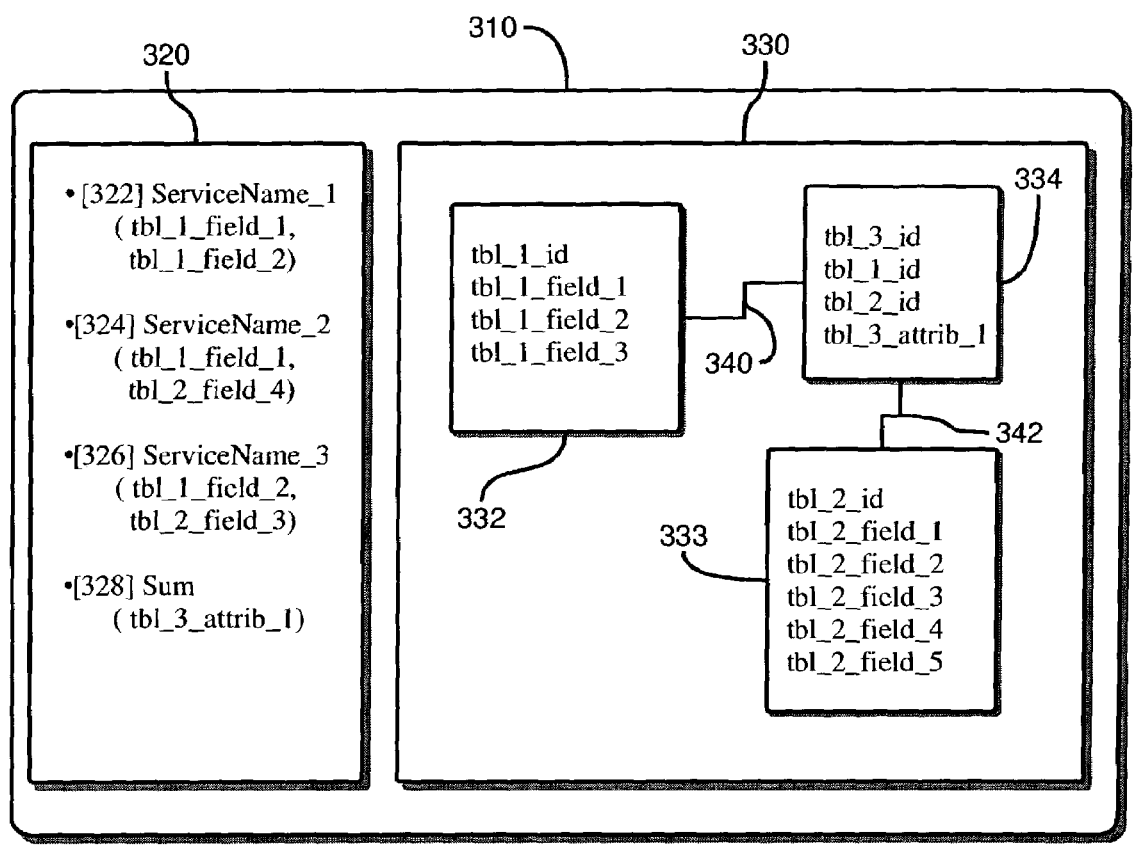
FIG. 3 depicts an example interface for providing schema information to assist with the configuration of network services in accordance with one or more embodiments of the invention.

FIG. 3 depicts an example interface for providing schema information to assist with the configuration of network services. The interface comprises a set of display regions 310 that optionally contain one or more other display elements (e.g. 320, 330 and 410). Each of these display elements or regions are rendered to present the developer with a series of design choices. Display element 320, for instance, lists a set of network services (e.g. Web Services 322, 324, 326 and 328) the developer may implement. The network services assistant also provides a mechanism for inputting a database schema or simply providing connection parameters to a data source. For example, by providing a user name, password and database connection protocol (e.g. ODBC, JDBC) a developer may connect to a data source such as a relational database. Once the appropriate database is identified, the network services assistant connects to the database for purposes of retrieving the database schema. In instances where a schema is not available, the network services assistant applies a reverse engineering function to the database in order to obtain the schema information.

Once obtained, the schema is displayed in display region 330. In FIG. 3, for instance, display region 330 contains three database tables. The network services assistant is capable of determining the relationships between one or more database tables and can traverse the hierarchy of tables to define network services that require the use of multiple tables. In FIG. 3, the assistant located two relationships: one between table 332 and table 334, and a second one between table 333 and 334. Each table has a primary key (e.g. tbl_1_id, tbl_2_id and tbl_3_id) that is unique to each record in the table. Primary keys are further used to link records from two or more tables into an association table. For example, in FIG. 3 table 334 is an association table that allows the system to associate tables 332 and 333. The system utilizes these relationships to determine the hierarchical structure of the fields in a database. Once the system determines such a structure, this relational mapping is used to provide data needed for purposes of providing network services. If data from multiple tables is required, the system is able use the hierarchical structure to determine how and where to obtain the required data.

B. Implementing Network Services

In addition to providing developers with an interface for obtaining and viewing data source information, the network services assistant allows developers to utilize a set of network services (e.g., individual web services or a set of web services that make up a transaction). In one embodiment of the invention, the network services available to the developer are shown within display region 320. The services illustrated in FIG. 3, (e.g., services 322, 324, 326) provide a way to access data fields (e.g., tbl_1_field_1, tbl_1_field_2), (tbl_1_field_1, tbl_2_field_4) and (tbl_1_field_2, tbl_2_field_3).

The network services assistant also allows the developer to create network services that manipulate data from the database. Network service 328, for instance, is designed to execute an operation that returns the sum of a particular data field or fields from one or more tables. To perform operations that utilize data from the database, the network services assistant dynamically evaluates a set of predefined rules, uses those rules to retrieve the data needed to perform the operation, performs the operation and returns an appropriate result.

Figure 4:
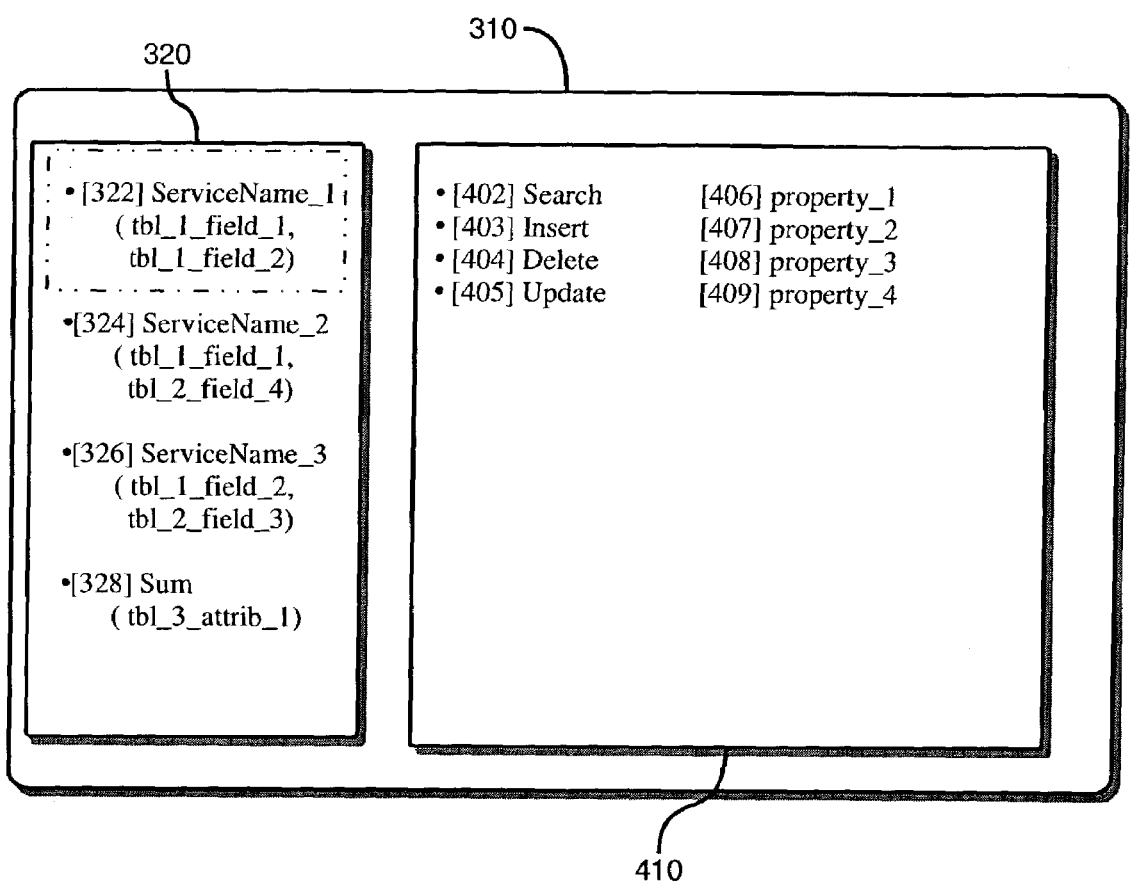
FIG. 4 depicts an example interface for providing configuration information related to one or more web services in accordance with one or more embodiments of the invention.

FIG. 4 shows an example of the graphical user interface components used to provide developers with the information needed to configure a network service. This is accomplished in one or more embodiments of the invention through the use of a graphical user interface that contains a set of display regions designed to allow developers to create operations relating to a particular service. In the example given, display region 410 shows a set of operations 402, 403, 404 and 405 that relate to searching a given data source as well as inserting, deleting and updating that data source.

The interface also provides developers with a mechanism for controlling the system's ability to define new operations associated with a particular service and add those new operations to the development process. For example, the developer may program a set of routines and add the routines to the default set of operations associated with each network service that has a use for such routines.

In addition to having the ability to manipulate operations relating to a network service, the system also provides users with a way to handle properties associated with each defined operation. An available set of properties associated with each operation are depicted, for example, within one or more components of the graphical user interface. In the illustration contained herein, display region 410 depicts properties 406, 407, 408 and 409. The properties are associated with a particular operation and define how the system behaves at runtime when executing the operation. An example of a simple property would be a property that indicates whether a particular operation is available or not. For example, if a data field in a database may not be altered or erased through the use of a web service, update operation 405, and delete operation 404 are simply flagged as "not available." The properties own attributes may not only affect the way a system handles a client's request, but also affect what type of response data is generated and how that data is transmitted to the client.

C. Generating Rule Sets

Once the data schema associated with the data source needed to perform a network service is obtained, a network service or set of network services are defined, and the developer sets the operations and properties relating to the service, the network services assistant generates a set of rules stored in rules store (e.g. flat files loaded by a rule engine). In one or more embodiments of the invention the process of generating the rule is made fully automatic.

Figure 5:
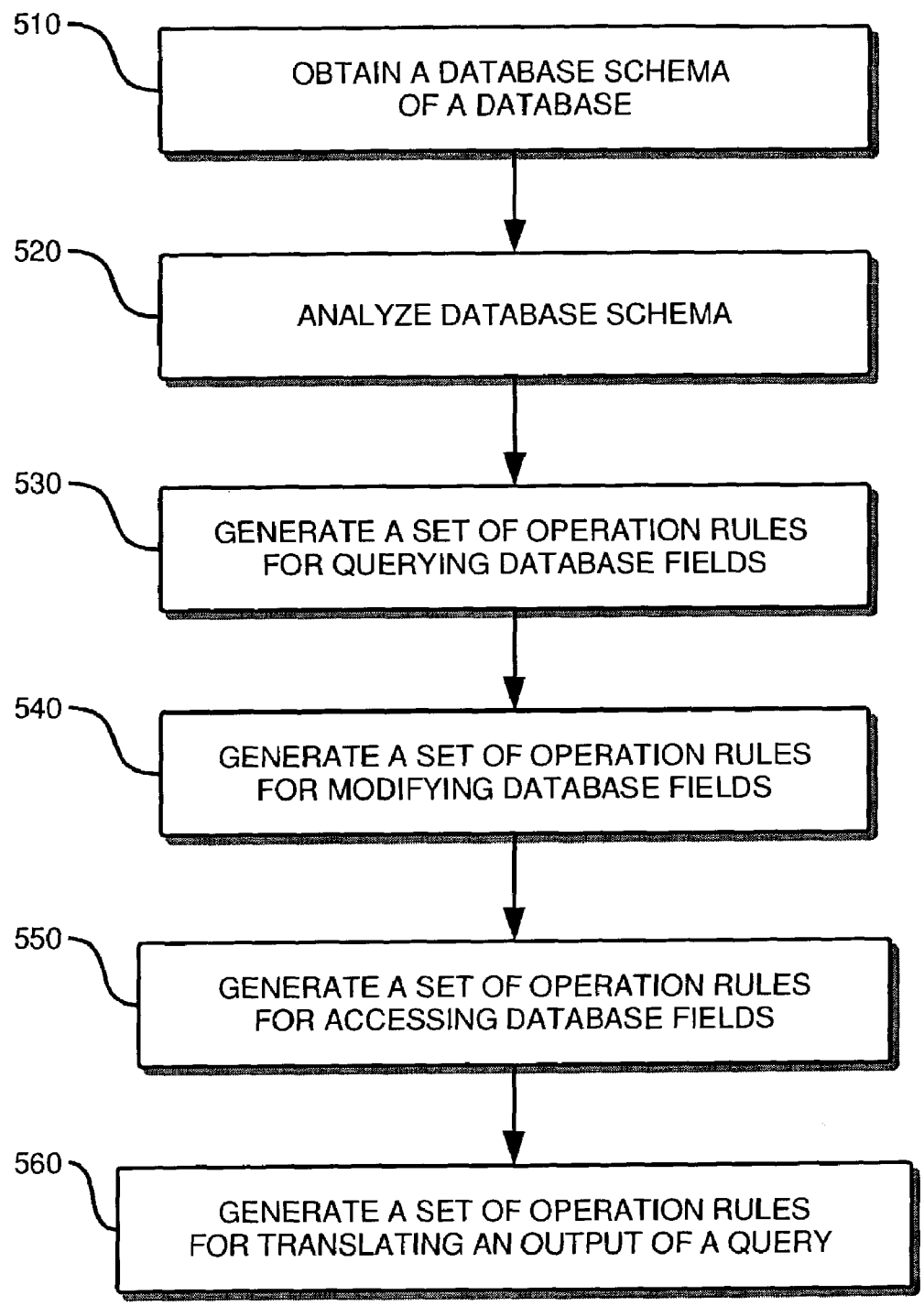
FIG. 5 illustrates the steps involved in generating rule sets that govern the creation and serving of network services in accordance with one or more embodiments of the invention.

FIG. 5 illustrates the steps involved in the process of generating rule sets that govern the creation and serving of network services. At step 510, the network services assistant obtains the database schema associated with the target data source (see e.g., step 210 described above). In one or more embodiments of the invention, the network services assistant utilizes a graphical user interface or some other interface, as described in FIG. 3, to capture user input and integrate that input with information collected from one or more data sources (e.g., the schema data). At step 520, the network services assistant analyzes the database information by checking the data type associated with each field of the database, identifying links between the database tables, and determining the hierarchical structure of the data in the database. The network services assistant may then generate a set of rules for querying the database (see e.g., step 530) and for modifying or otherwise handling data fields in the database (see e.g. step 540). The system embodying one or more aspects of the invention can also generate a set of operational rules for accessing the database. These rules are typically stored in the rule store and used at runtime to determine how and when to create one or more query objects in response to a client request. When the system elects to create a query object, information such as database specific, table specific and field specific privileges are typically examined. The operational rules define the type of information that may be embedded in a query object and utilized when accessing the database to add, retrieve or alter data.

At step 560, the network services assistant generates a set of operational rules for translating the data into a format compatible with one or more destination protocols serving data to a requesting client. The system can, for instance, translate the data served in response to a client request into Web Services Description Language. The data is further serialized for transmission to clients using one or more communication protocols. In one embodiment of the invention, the communication protocol of choice is SOAP. However, the system may utilize any protocol capable of providing network services to transmit data to the client.

Providing Network Services

Figure 6:
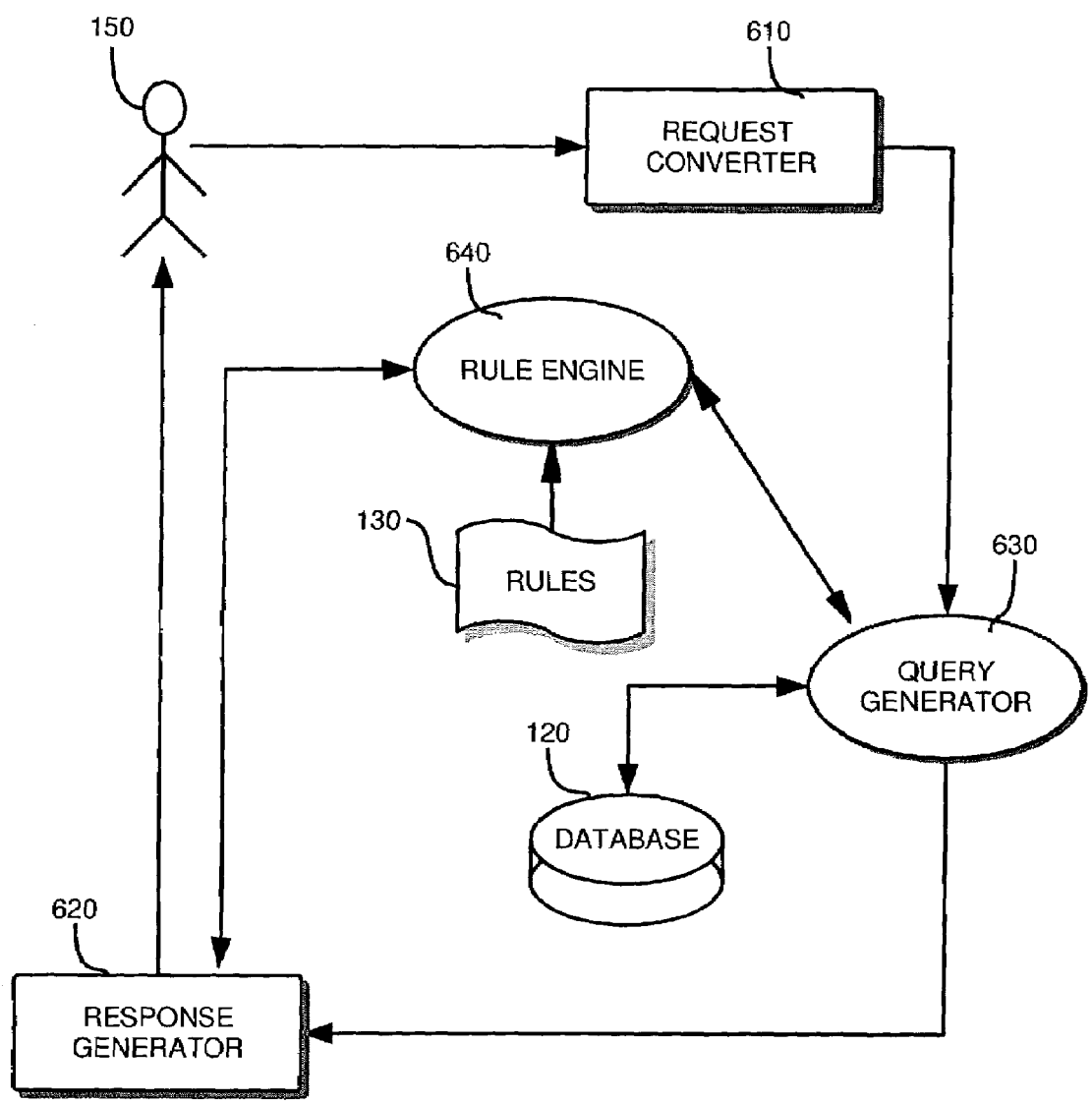
FIG. 6 is a block diagram illustrating the processes involved in providing network services in accordance with one or more embodiments of the invention.

FIG. 6 is a block diagram illustrating the processes involved in providing network services utilizing one or more embodiments of the invention. In the example that is given, client 150 issues a request for data. A request converter 610 that utilizes one or more software modules to analyze the request typically handles this request. The request converter may, for instance, verify the validity of a web service name and determine if the appropriate parameters are passed with the request and the requested operations. The request converter may also combine request information with data provided by the execution environment. The system may, for instance, integrate session information and/or information obtained from electronic cookies with the request analysis. In an embodiment of the invention, the request converter parses SOAP formatted data received as XML text to convert the request data into a request object.

An example of a type of request object is an object orientated class (e.g. JAVA coded class object) capable of storing request data, and enabled with one or more operations (e.g. mutators) invoked to retrieve the request data from the request object.

The request converter may utilize a rule engine 640 built using artificial intelligence tools. In one embodiment of the invention, the rule engine contains an inference engine capable of executing a chain of logical steps using rule data obtained from one or more rule data sources (e.g. 130). The rule engine is configured to interface with multiple system components and thereby allows the system to invoke the rule engine at multiple levels and throughout different stages of the data processing event. Moreover, operators of the system (e.g. developers, maintainers or even the end user) can modify one or more rule stores which result in the changes to the system's behavior without requiring modifications to the rule engine's program code.

After the request converter creates a request object, a query generator 630 generates a query to obtain data from its data source (e.g. 120). The query generator invokes the rule engine to determine the conditions that apply to generating a query to a data source based on the data source's access privilege parameters and the content of the request object. For example, a request aimed at retrieving a person's personal data stored in a relational database would cause the query generator to invoke the rule engine to determine the client's access privileges and the access authorization parameters. The developer can explicitly set these authorization parameters or the system can automatically generate such parameters using access privileges stored in the database. In embodiments of the invention, the query is an object oriented class capable of storing data and enabled with operations. The system may invoke these operations to retrieve data from the object or access data sources associated with the object.

Response generator 620 depicted in FIG. 6, represents a program module (or a set thereof) capable of converting the data obtained from a data source through the query object into response data suitable to be transmitted using one or more transmission protocols. Response generator 620 contains one or more mechanisms for invoking rule engine 640 which provides response generator 620 with conditions to generate a response. Rule engine 640 may, for instance, determine on behalf of response generator 620 that the responses for a specific network service are to be transmitted in a specific protocol (or data format). For example, rule engine 640 may determine that all requests for data having full read-access privileges in the database should be formatted in HTML. Response generator 620 could obtain data stored in object-oriented objects and convert that data into the format designed for transmission on a network.

In an embodiment of the invention, data obtained from querying the data source is converted to one or more objects represented in Web Services Description Language format. The latter objects are then encoded using the SOAP format for transmission back to the client 150.

Figure 7A:
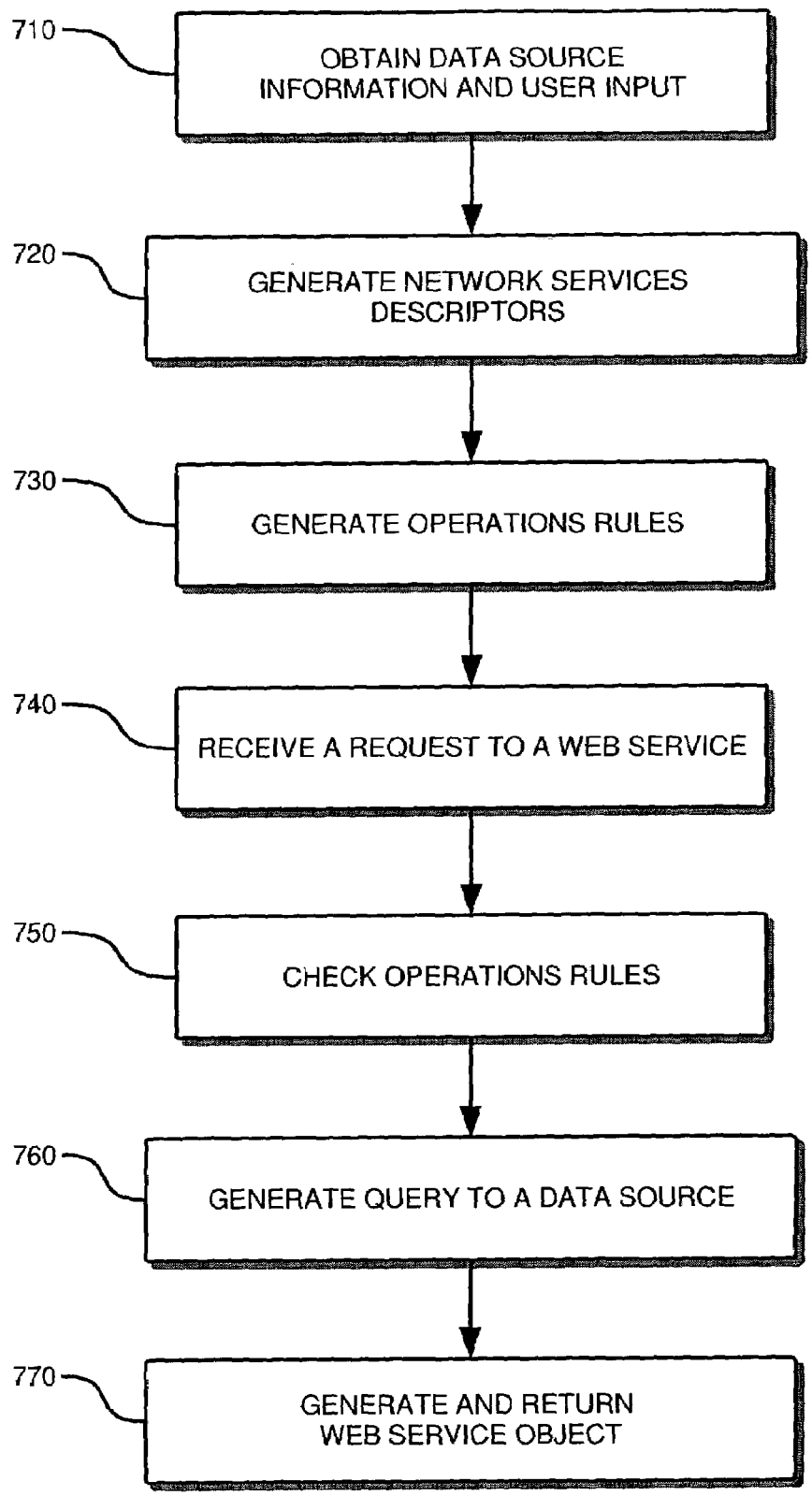
FIG. 7A and FIG. 7B illustrate a mechanism for providing network services in accordance with one or more embodiments of the invention.
Figure 7B:
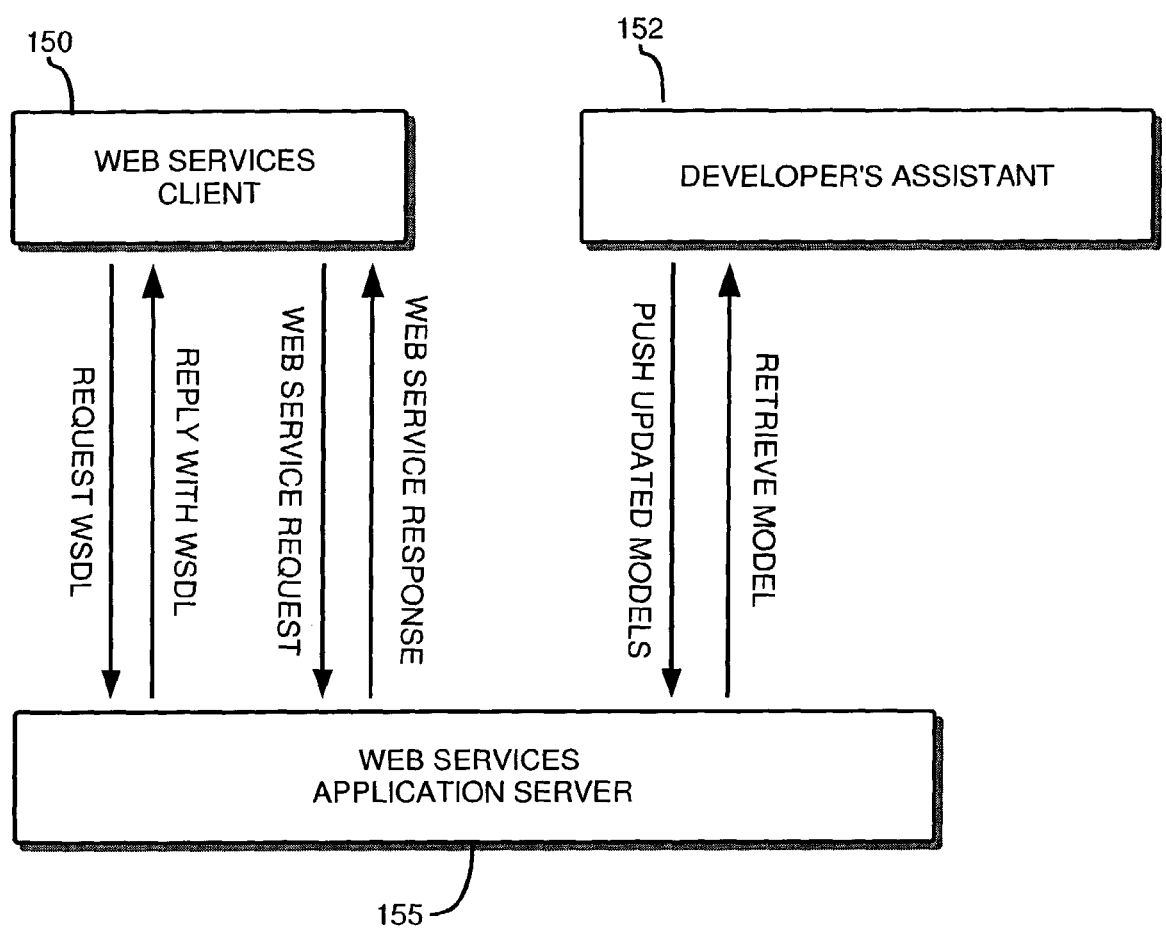

FIG. 7A and FIG. 7B illustrate the mechanism by which a system embodying the invention provides network services. FIG. 7A is a flowchart illustrating steps involved in the process of providing network services. The process begins by collecting information about the data source and receiving a developer's input at step 710. This step is typically conducted using the network services assistant described above, although the system may manually obtain the information collected as well as the developer's input or use one or more other developer's tools.

At step 720, embodiments of the invention generate descriptors for the network services the system is capable of utilizing. These network service descriptors are a set of rules and templates that define aspects of the network services to be provided. Such network service descriptors may, for instance, define a network service name, one or more operations associated with the network service and rules that may define access privileges to the operations.

At step 730 a system embodying the invention generates operational rules that allow, for example, an engine to generate database queries in response to a network services request and process response data as described above in FIG. 2. When generating a response to a request, the rules are utilized to convert data from one representation (e.g. relational database) into a format such as Web Services Description Language designed for data communications. At step 740, the system receives a request from client 150 (see e.g., FIG. 6 description). In its one implementation, the invention utilizes an application server (e.g. 155) that performs all steps of the present invention. However, alternative implementations are contemplated as within the scope of the invention defined herein. The invention may, for instance, make use of software modules (sometime called plug-in modules) designed for implementation in third party application servers or any other software program designed to provide network services.

At step 750, the system checks the operational rules discussed herein by invoking rule engine 640 and carrying out the processes, described in FIG. 6, for validating a request and converting that request into an object oriented representation. The rules are typically generated via a developer application such as the network services assistant described throughout. At step 760, the system generates a query to access one or more data sources following a set of rules that associate data sources with network services. At step 770, the system applies the rule set by retrieving the data from one or more data sources, converting the data in accordance with one or more communication protocols and transmitting the data to the client.

Although the description set forth so far utilizes the term network services, the reader should note that one or more embodiments of the invention are applied to providing a type of network service(s) called Web Service(s).

Handling a Request to a Web Service

Figure 8A:
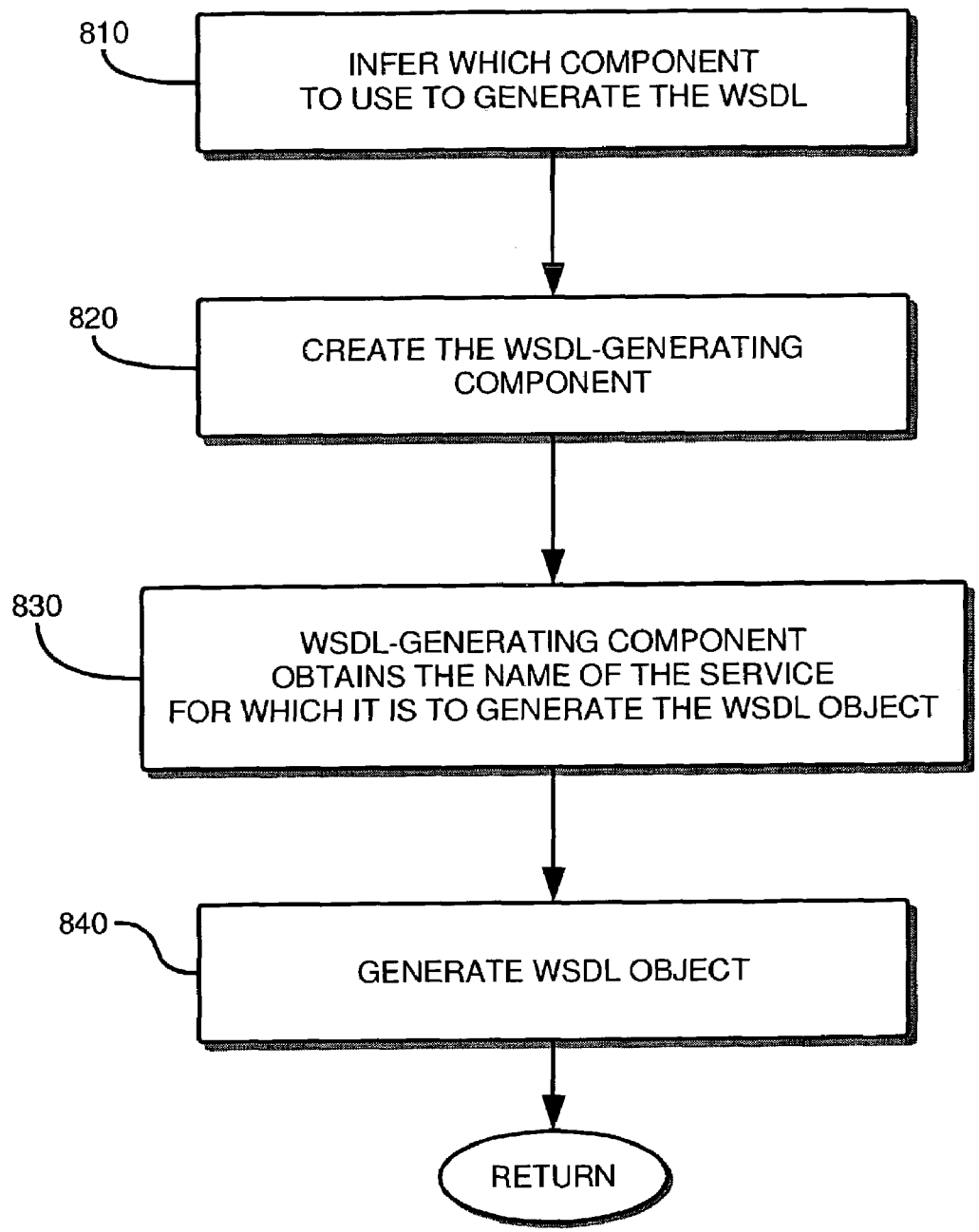
FIG. 8A and FIG. 8B illustrate the process for handling a request to a Web Service in accordance with one or more embodiments of the invention.
Figure 8B:
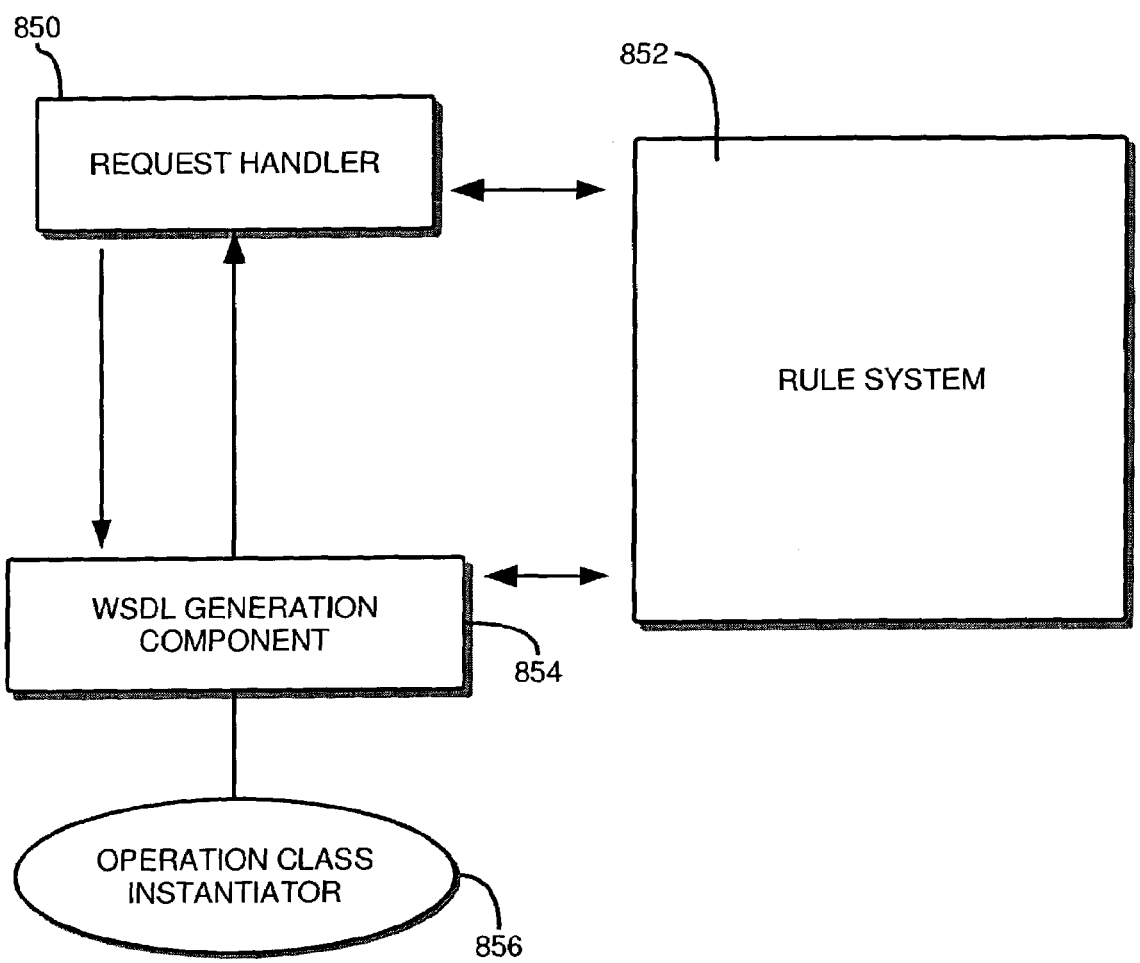

FIG. 8A and FIG. 8B illustrate the process by which a system embodying the invention handles requests made to a Web Service. At step 810, the system receives a request from Web Service client 150. A request to a Web Service is an XML coded message, typically, using SOAP. The system can submit the message directly to a server through a network socket or using HTTP. For example, the Web Service request may be received over HTTP as the following:

http://www.foo.ext/path/ServiceName?wsdl

Upon receipt of the request, the request message is directed to a module (e.g., request handler 850) configured to enable the system to communicate with rule system 852. The rule system comprises a rule engine 640, a rule store 130 and multiple components (not shown) that allow the rule system to interface with other components in the system (e.g. an Application Server), or to integrate (as an embedded applet or a plug-in) within third party applications. Utilizing the capabilities of the rule system 852, the request handler 850 infers, using the name of requested Web Service and the arguments contained in the request, the component that is capable of generating the Web Service response. At step 820, the system instantiates the WSDL-generating component. Block 854 represents the module that creates the WSDL-generating component. The latter is interfaced with the rule system 852, and is capable of inferring the name of the operation to be invoked to generate a Web Service response. At step 830, the WSDL-generating component instantiates one or more operations that allow the system to communicate with data sources. Block 856 represents a process that enables the WSDL-generating component to instantiate the operations required to generate the WSDL response. At step 840, the system generates the WSDL, while utilizing the rule system to determine the conditions associated with the WSDL-generation. The WSDL-generating component then returns the WSDL data to the system that, in turn, forwards the data to the client.

Figure 9A:
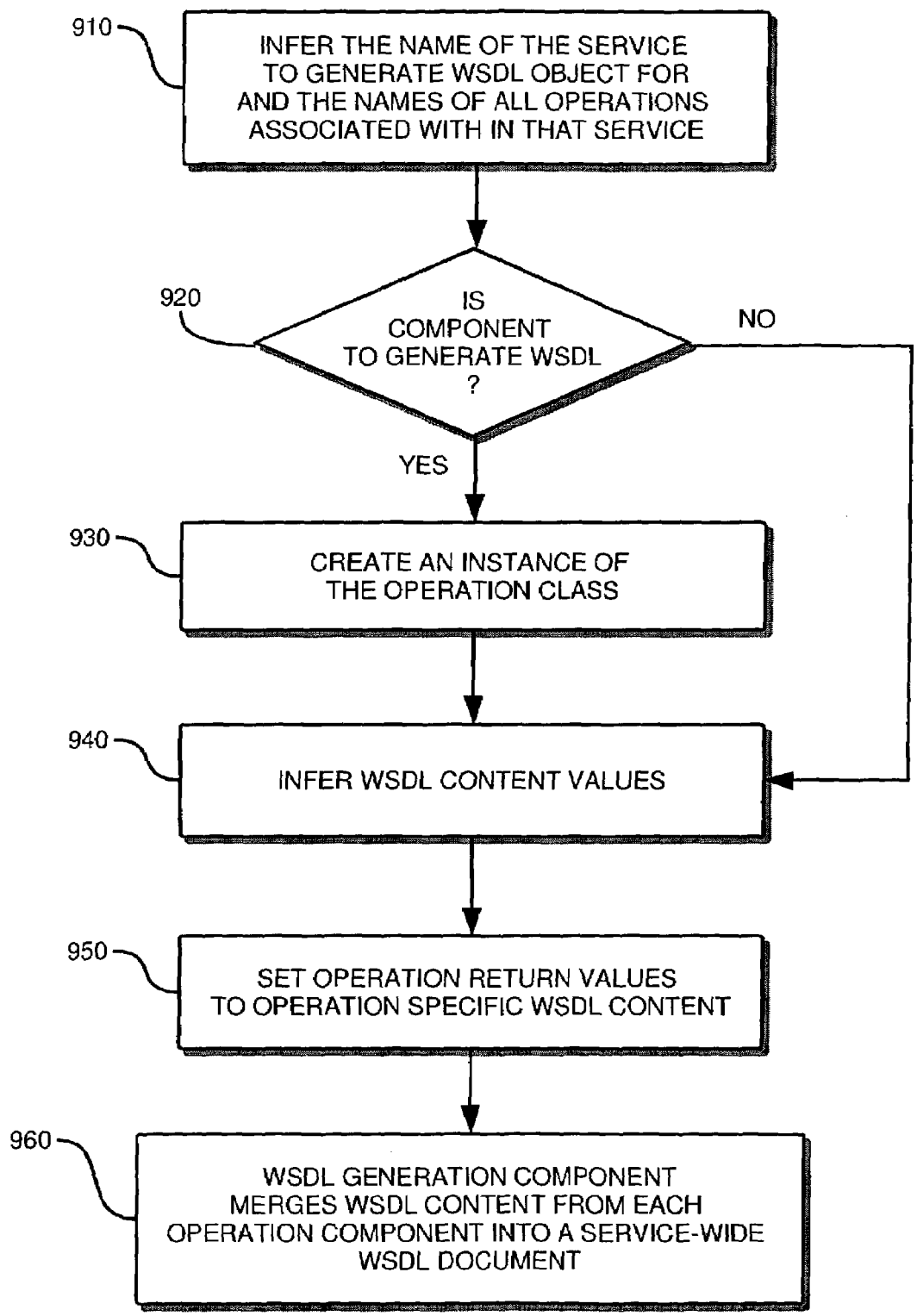
FIGS. 9A and 9B illustrate the process for generating WSDL data in accordance with one or more embodiments of the invention.
Figure 9B:
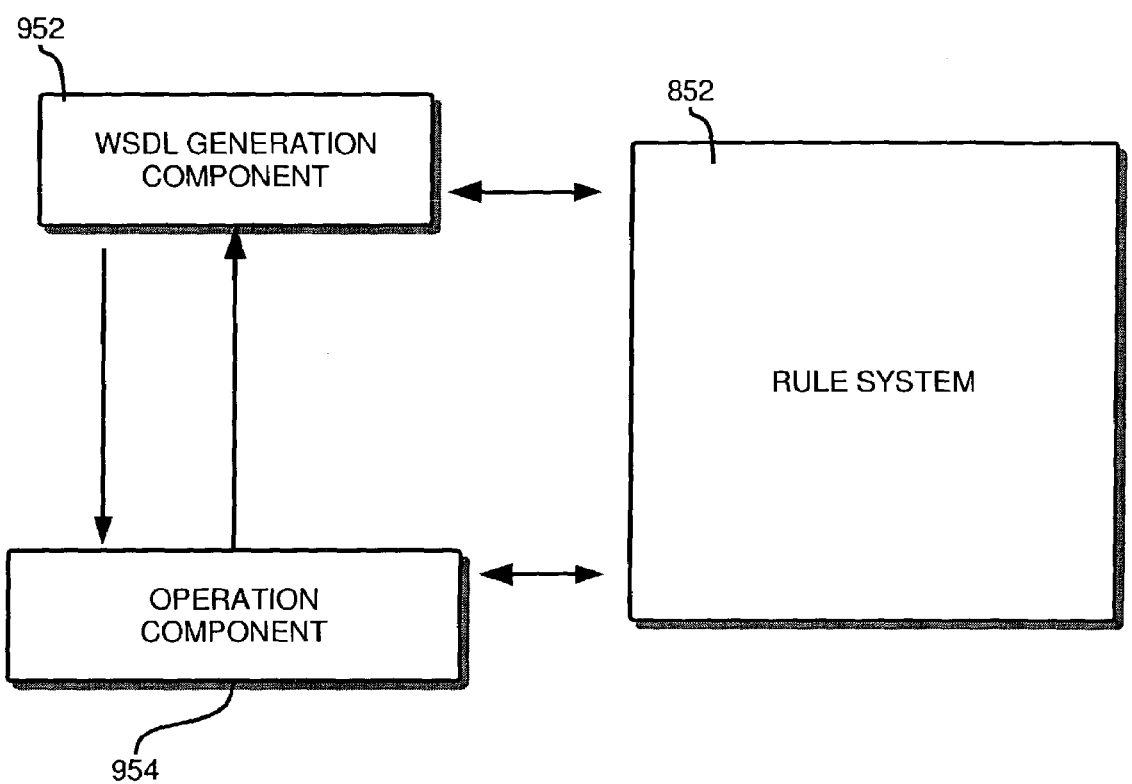

FIGS. 9A and 9B illustrate the process by which systems embodying the invention generate WSDL data. At step 910, the system utilizes the rule system to infer the names of the components capable of handling the request, and the names of all the operations in the service. At step 920, the system infers, for each operation's name, which component is to generate WSDL content. Modules 952 and 954 both interface with the rule system and are capable of invoking the rule system for inferring component names and operations. At step 930, the system creates an instance for each operation class found at step 920. At step 940, the system infers the WSDL data content values such as input names and types, output names and types, parameter ordering, operation name, schema types, binding name and all other information that the system requires to execute the operations and generate the WSDL content. The latter step allows the system to condition the WSDL output without hard coding the WSDL generation specifications in the WSDL generation component itself as it is common use in prior art. In the invention WSDL generation rules are input in the rule system. The latter approach allows for a greater flexibility in the system's behavior. Thus, users of the system are not required to manually create WSDL to initiate a Web Service.

At step 950, the system executes the operations having content specific to each one of the operations. At step 960, the WSDL-generating component merges the WSDL content from each component into a service wide WSDL document to be returned to the client.

Handling a Web Service Invocation

Figure 10A:
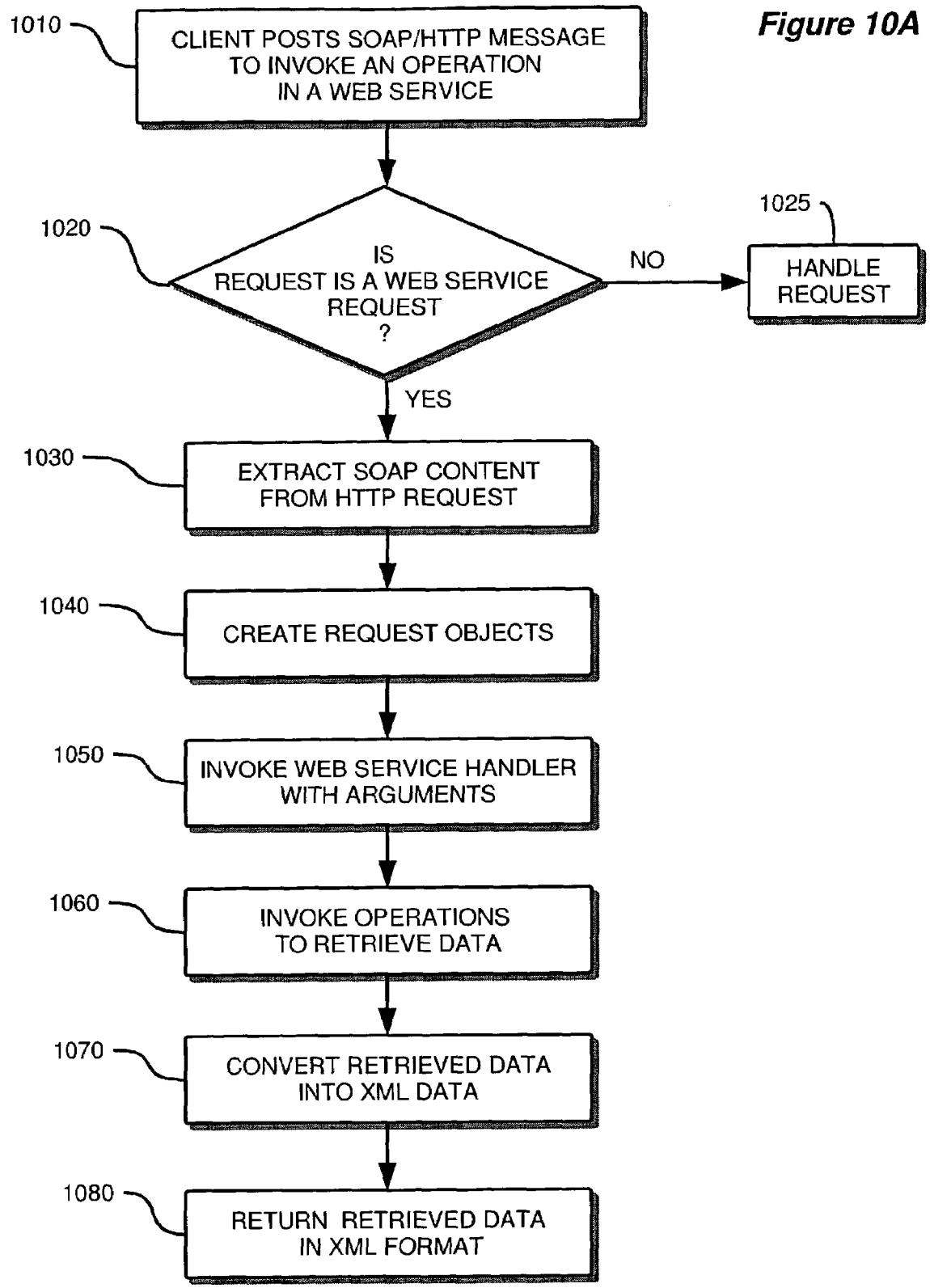
FIG. 10A and FIG. 10B illustrate the process for invoking a Web Service in accordance with one or more embodiments of the invention.
Figure 10B:
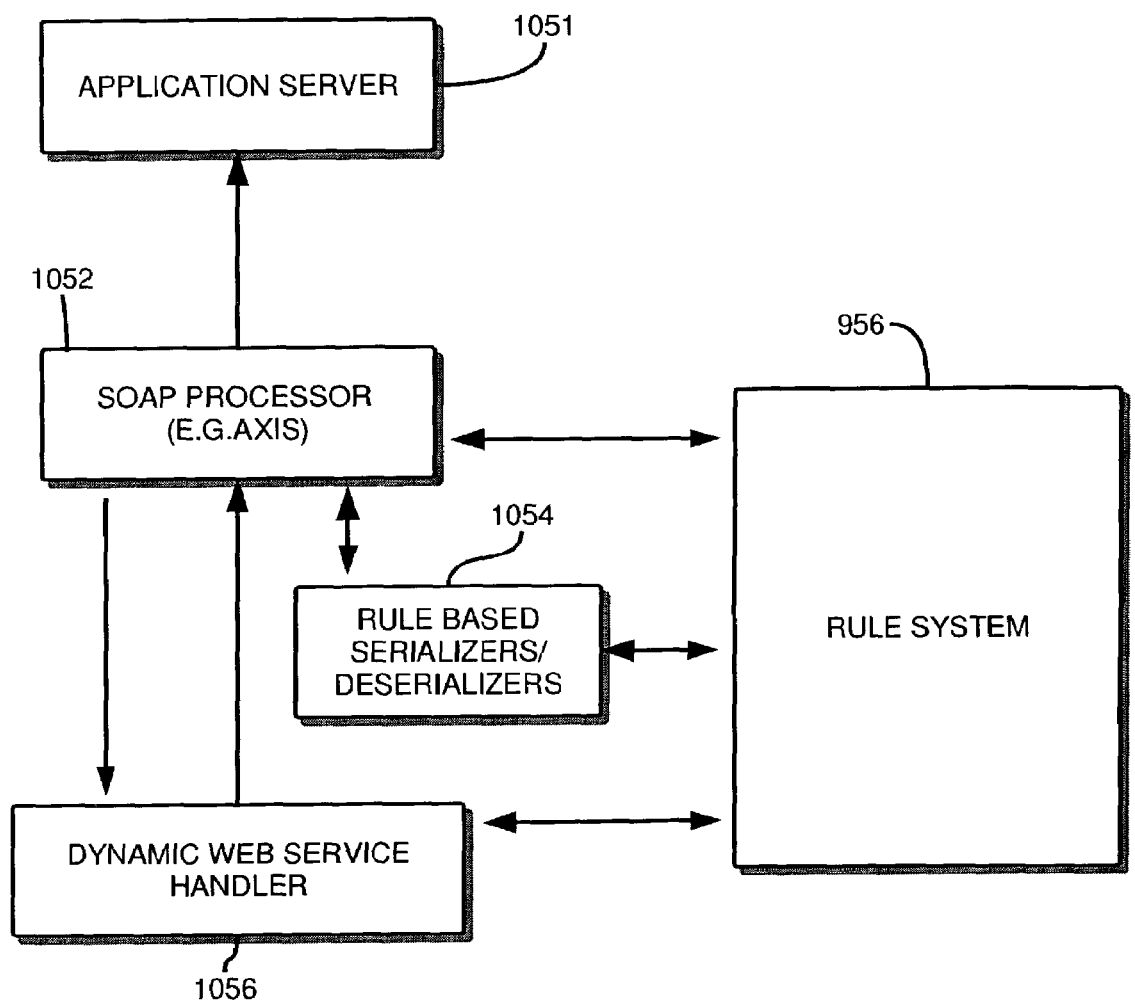

FIG. 10A and FIG. 10B illustrate the process by which a system embodying one or more aspects of the invention handles the invocation of a Web Service. Before invoking a Web Service operation the system receives a SOAP message, or an HTTP request, from a Web Services client (e.g., step 1010). A typical example of an instance where Web Services are applicable involves a creating a request to search a database. The request may be a Uniform Resource Locator (URL) that contains the name of the Web Service and one or more parameters indicating, for instance, a search word or phrase. The request may also contain output parameters, such as sorting information or a search category. Block 1051 represents one or more application server modules for handling the receipt of network connections and forwarding of requests to the proper request handler. At step 1020, the application server determines whether the request is destined to a Web Service. If the request does not target a Web Service, the application server forwards the request to the proper server component for handling requests of that type. If the request targets a Web Service, the application server routes the request to a SOAP processor 1052. In one embodiment of the invention, SOAP processor 1052 is an application component capable of parsing the message encoded in accordance with SOAP (which utilizes XML), and converts the data into data structures, objects and classes (e.g., in an object oriented sense). In one embodiment of the invention, SOAP processor 1050 contains AXIS software (developed by the APACHE Group).

SOAP processor 1050 extracts a SOAP message from the HTTP request (e.g., step 1030) and converts the SOAP request message into request objects. The conversion process involves a rule-based serializer/deserializer 1054, which is a module that is interfaced with the rule system. Serialization refers to the process that enables the system to convert blocks of structured data (e.g. data structures, classes etc) into streams of data. Systems frequently utilize the process of serialization to transfer data between the different nodes in a network. The deserialization process does the opposite by assembling streamed data into structured blocks of data. The deserializer of block 1054, receives SOAP information and converts it into structured data under control of the rule system.

At step 1050, a system embodying the invention invokes a dynamic Web Service Handler 1056 while submitting arguments such as the service name, operation name, request objects created in the previous step, and other information provided by the application server (e.g., such as session information). At step 1060, the system executes one or more operations and typically retrieves data from one or more data sources. The result of executing the operations is an array of model data object(s).

Once obtained, the system returns these data objects to SOAP processor 1052 (e.g., step 1070) which utilizes serializer 1054 to convert data from object based data to streamed data. SOAP processor 1052 handles the streamed data by converting that data into XML. SOAP processor 1054 has the ability to invoke the rule system and thereby allow the system to exert control over the way data in preparation for transmission over the network. At step 1080, the system returns the data in its serialized form to one or more Web Services clients.

Figure 11A:
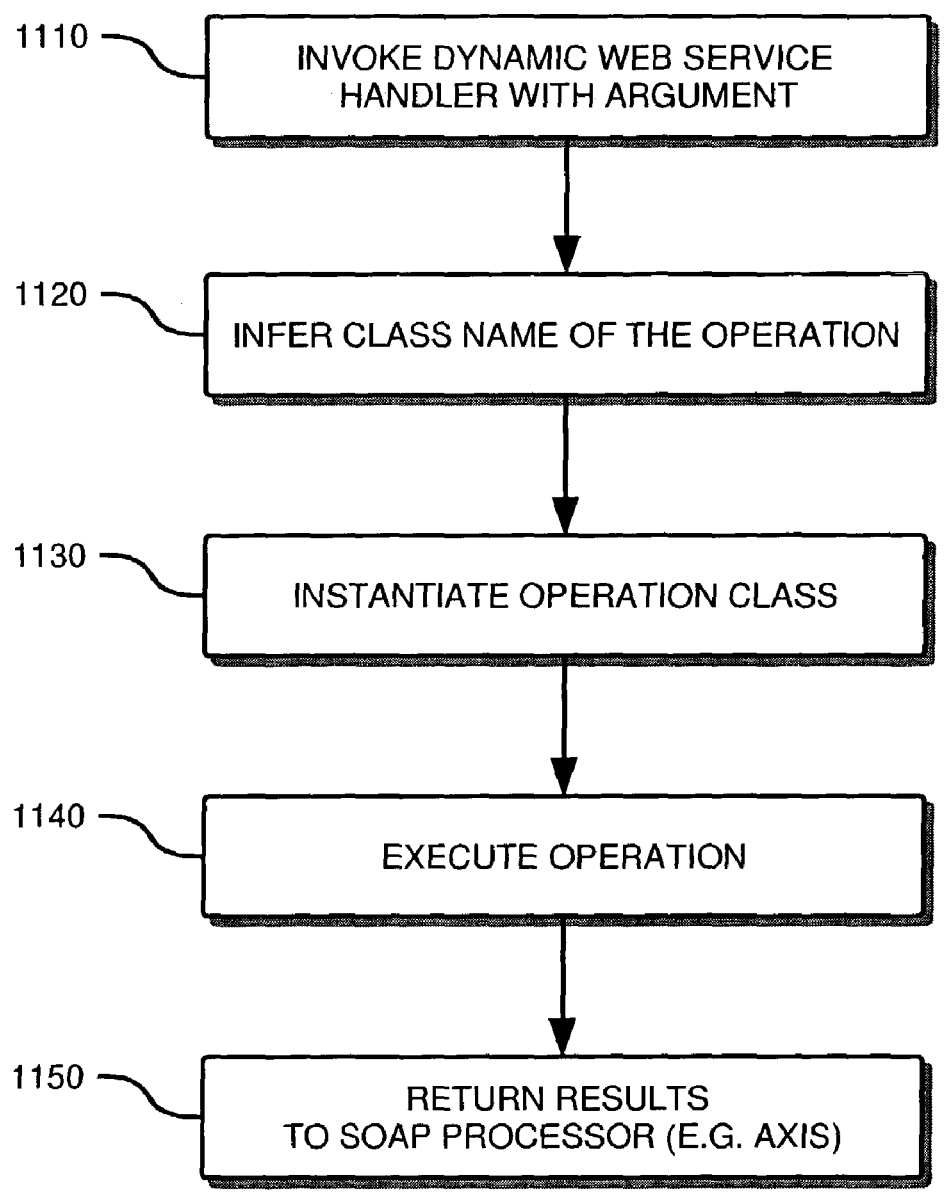
FIGS. 11A and 11B illustrate the process for dynamically handling Web Service objects and the creation and execution of operations objects in accordance with one or more embodiments of the invention.
Figure 11B:
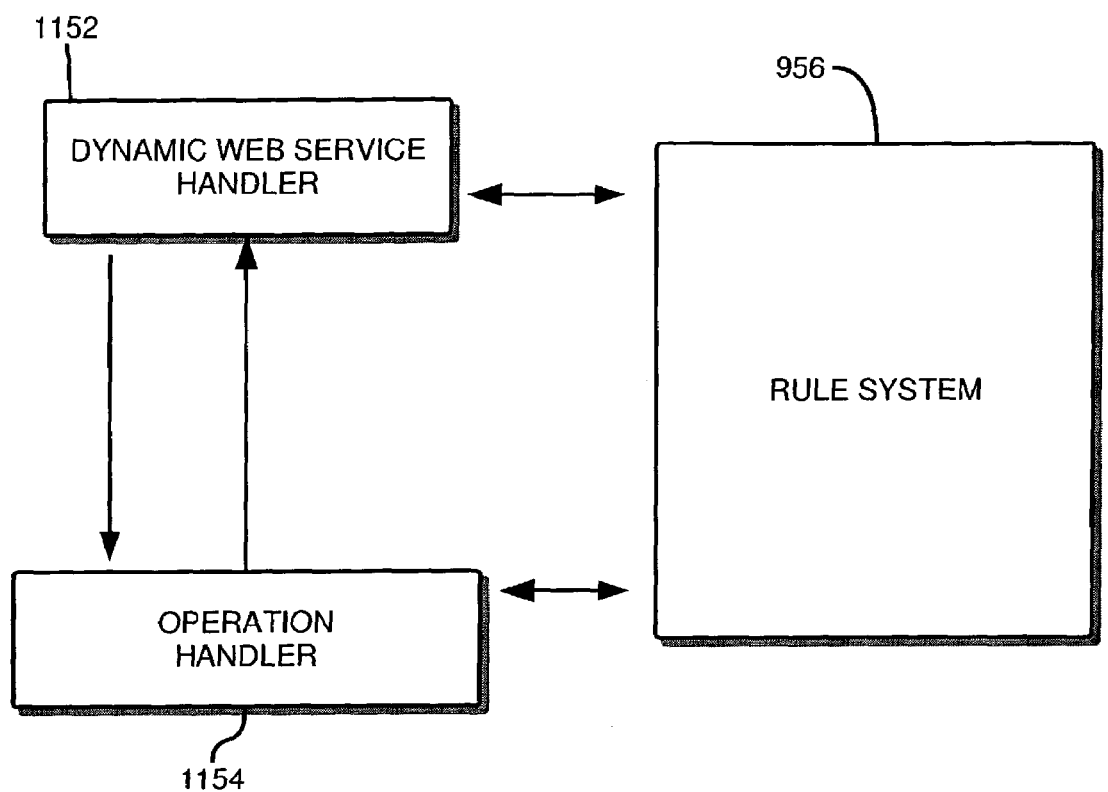

FIGS. 11A and 11B illustrate the process by which a system embodying the invention dynamically handles Web Service objects as well as the creation and execution of operations objects. FIGS. 11A and 11B further expand upon the description relating to step 1050 shown in FIG. 10A. At step 1110, the system invokes a dynamic Web Service handler 1152 with arguments as described above.

At step 1120, the Web Service handler infers the class name of the operation handler 1154 defined for this invocation and some environment settings (e.g., entity name, task and service name). At step 1130, the system instantiates the corresponding class for one or more target operations. Operation handler 1154 interfaces with rule system 956 and can thereby utilize the rule system to supervise class instantiation and the execution of the various operations. Through the rule system, the operation handler 1154 has access to invocation parameters and variables such as the mapping between the public name of attributes (exposed as arguments) and the corresponding internal names used for data manipulation. Operation handler 1154 can also obtain the value of arguments used to invoke the operation.

Rule system 956 also provides object entity types identifying the sort of objects the operation is intended to work with. Providing target entity types is important because it allows system components to utilize a single class to handle multiple different entity types. For example, in a system referred to as Direct to WebServices™, one class a series of operations (e.g., search, insert, delete, and update) is invoked to automatically handle many different types of entities. Furthermore, operation handler 1154, is able to determine, through the rule system, whether to immediately commit (or not commit) changes to its object graph. The system then executes the operations (e.g., step 1140) and returns the results of the execution to the SOAP processor (e.g., step 1150).

Figure 12A:
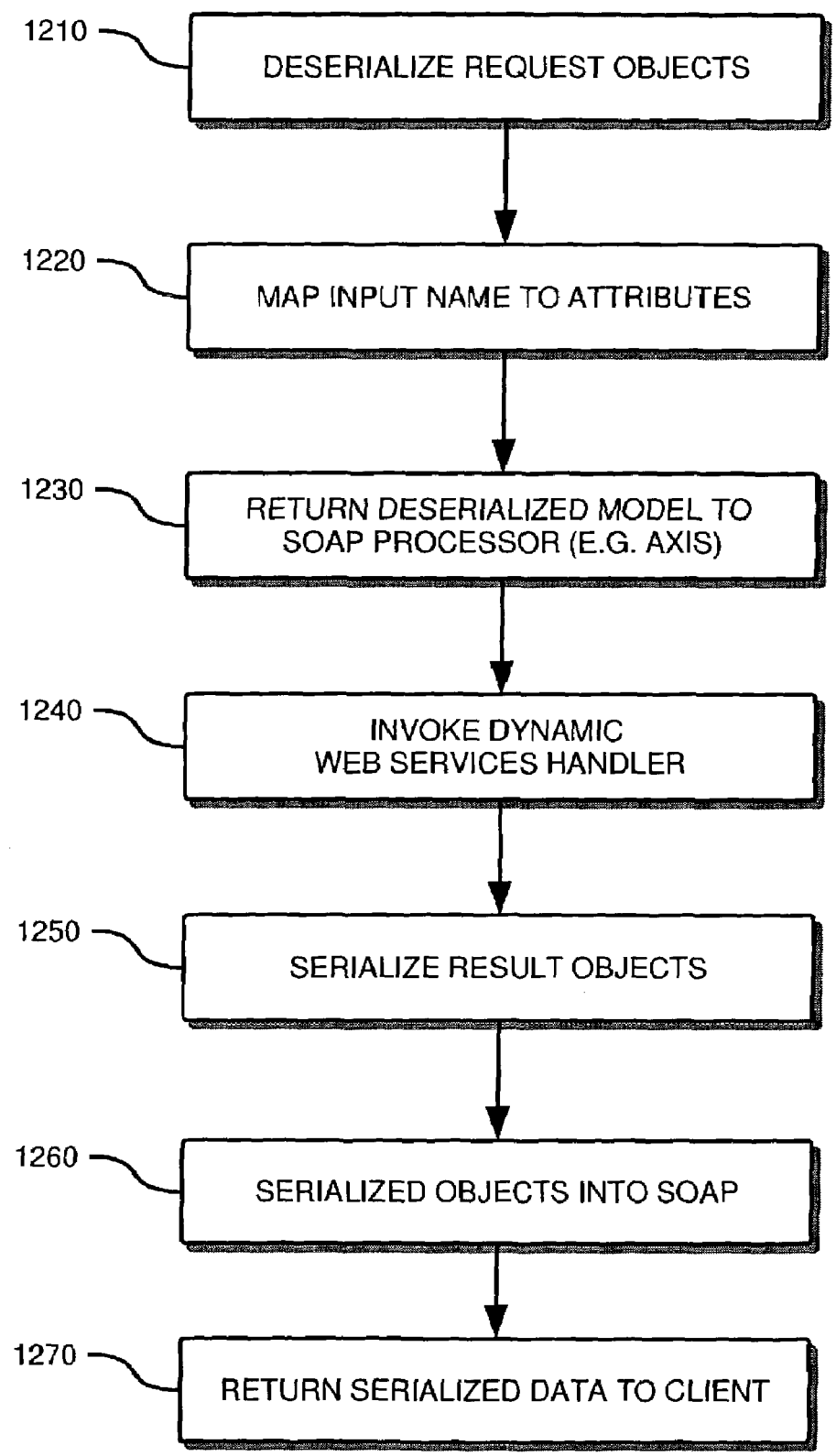
FIG. 12A and FIG. 12B illustrate the process for utilizing rule based serializers and deserializers in accordance with one or more embodiments of the invention.
Figure 12B:
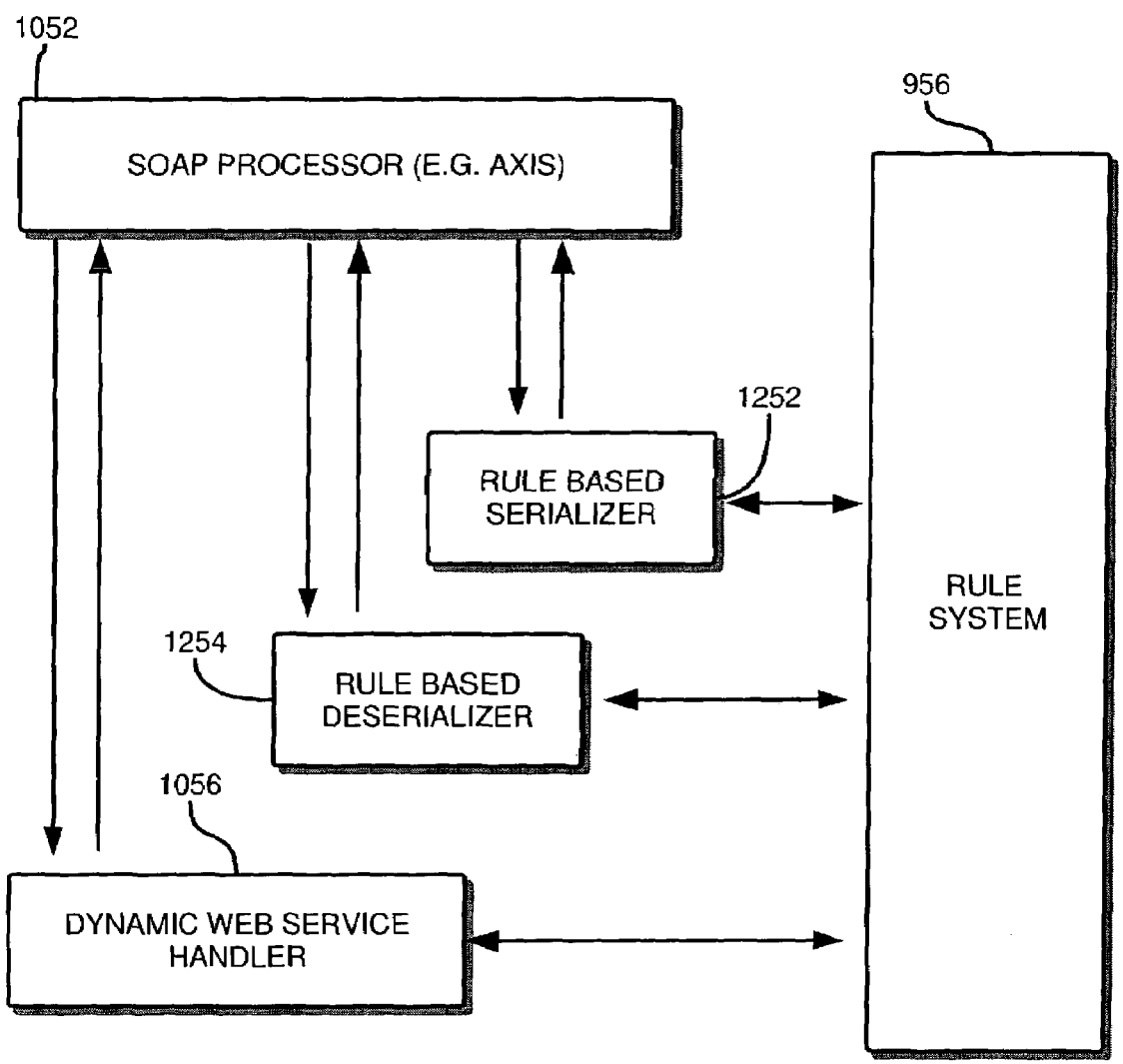

FIG. 12A and FIG. 12B illustrate the process by which a system embodying the invention utilizes rule based serializers and deserializers. As was noted above, serialization is an important aspect for network communications. At step 1210, the SOAP processor invokes a deserializer 1254 to unmarshall data objects referred to in one embodiment of the invention as Enterprise Objects. At The deserializer utilizes rule system 956 to infer a mapping between Web Service input part names and entity attributes (e.g., step 1220) and returns the deserialized object models to the SOAP processor (e.g., at step 1230).

At step 1240, the system invokes the dynamic Web Service handler with input part values (including deserialized model objects). At step 1250, the result object(s) of the web service invocation are returned to the SOAP processor for serialization (e.g., step 1252). Serializer 1252 is interfaced with the rule system and can thereby convert result objects into XML using a set of serialization rules. The rule-based serializer can infer the conditions for data serialization at multiple steps. For example, the serializer infers which attributes to serialize, the mapping of an entity attribute name to XML property name, the order in which to serialize properties, and any other serialization rule input by a developer or a user into the rule system. The SOAP processor has the ability to generate one or more SOAP messages (e.g., step 1260) and can return generated SOAP messages to the client (e.g., step 1270).

Thus a method, system and apparatus for automatically providing network services (e.g. Web Services) has been described. The invention improves upon existing methods for providing network services by reducing the time and effort required to initiate use of these network services. A developer can, for instance, automatically generate several different types of rules and use those rules with a rule system interfaced with one or more application server components. Thus, the system provides a way to control how requests to network services are handled, data is retrieved from data sources and manipulated, and output is generated.

What is claimed is:

1. A network services assistant computer program in a storage medium comprising computer program code executed by a processor to:

obtain a database schema of a database;

analyze said database schema to determine a hierarchical structure within a plurality of database fields in said database;

integrate a user input and the hierarchical structural information from the analysis of said database schema;

generate programmatically based on the integrated user input and the hierarchical structural information a set of operation rules for utilizing said database fields, the set of operation rules for utilizing said database fields comprising one or more rules for examining one or more of database specific, table specific, and field specific privileges;

generate a set of operation rules for translating an output of a query to said database into one of a plurality of data communication languages; and store said set of operation rules for utilizing said database fields and said set of operation rules for translating an output of a query to said database into one of a plurality of data communication languages in a manner that makes the respective sets of operation rules available to a rule engine configured to implement them.

2. The network services assistant of claim 1 wherein said computer program code configured to analyze said database schema further comprises computer program code configured to provide an object description for building entities to store data.

3. The network services assistant of claim 1 wherein said computer program code configured to analyze said database schema further comprises computer program code configured to provide an object description for accessing data in said database.

4. The network services assistant of claim 1 wherein said computer program code configured to analyze said database schema further comprises computer program code configured to generate a hierarchical structure involving multiple database tables.

5. The network services assistant of claim 1 wherein said computer program code is further configured to generate a set of operation rules for querying said database fields.

6. The network services assistant of claim 5 wherein said computer program code configured to generate said set of operation rules for querying said database fields further comprises computer program code configured to provide a data type for each of said database fields.

7. The network services assistant of claim 1 wherein said computer program code is further configured to generate a set of operation rules for modifying said database fields.

8. The network services assistant of claim 7 wherein said computer program code configured to generate said set of operation rules for modifying said database fields comprises computer program code configured to provide controls for handling database transactions.

9. The network services assistant of claim 1 wherein said computer program code is further configured to generate a set of operation rules for accessing said database fields.

10. The network services assistant of claim 9 wherein said computer program code configured to generate said set of operation rules for accessing said database fields further comprises computer program code configured to handle user privileges at run time.

11. The network services assistant of claim 1 wherein said computer program code configured to generate a set of operation rules for translating said output further comprises computer program code configured to generate data compatible with SOAP.

12. The network services assistant of claim 1 wherein said computer program code configured to generate a set of operation rules for translating said output further comprises computer program code configured to generate data compatible with Web Services Description Language.

13. A method for providing web services comprising:
obtaining a database schema of a database;
analyzing said database schema to determine a hierarchical structure within a plurality of database fields in said database;
integrating a user input and the hierarchical structural information from the analysis of said database schema;
generating programmatically based on the integrated user input and the hierarchical structural information a plurality of operation rules for utilizing said database fields, the plurality of operation rules for utilizing said database fields comprising one or more rules for examining one or more of database specific, table specific, and field specific privileges;
making said plurality of operation rules available to a rule engine configured to implement said plurality of operation rules;
generating a plurality of descriptors for a plurality of web services based on said schema; and
providing one of said plurality of web services upon receiving a request containing at least one of said plurality of descriptors, by executing said plurality of operation rules, building a request for accessing said database, accessing said database and returning data in a data form based on a web services protocol.

14. The method of claim 13 wherein said database further comprises a relational database having a plurality of tables and a plurality of relationships linking said plurality of tables.

15. The method of claim 13 wherein said database further comprises a data source using directory services.

16. The method of claim 13 wherein said generating a plurality of descriptors further comprises generating a publishable name to describe each one of said plurality of web services.

17. The method of claim 13 wherein said generating a plurality of descriptors further comprises automatically generating a set of operations for accessing said plurality of web services.

18. The method of claim 17 wherein said automatically generating a set of operations further comprises automatically generating a set of functions for accessing said database.

19. The method of claim 18 wherein said set of functions further comprises at least one function for adding data to said database.

20. The method of claim 18 wherein said set of functions further comprises at least one function for deleting data from said database.

21. The method of claim 13 wherein said generating said plurality of operation rules further comprises generating a set of conditional statements each of which are combined with an execution statement.

22. The method of claim 13 wherein said plurality of operation rules comprises a hierarchical structure defining the precedence of each rule within said plurality of operation rules.

23. A method for automatically providing web services comprising:
obtaining a database schema of a database;
analyzing said database schema to determine a hierarchical structure within a plurality of database fields in said database;
integrating a user input and the hierarchical structural information from the analysis of said database schema;
generating programmatically based on the integrated user input and the hierarchical structural information a set of operation rules for utilizing said database fields, the set of operation rules for utilizing said database fields comprising one or more rules for examining one or more of database specific, table specific, and field specific privileges;
generating a set of operation rules for translating an output of a query to said database into one of a plurality of data communication languages;
storing said set of operation rules for utilizing said database fields and said set of operation rules for translating an output of a query to said database into one of a plurality of data communication languages in a manner that makes the respective sets of operation rules available to a rule engine configured to implement them;
receiving from a client a request comprising a web service and at least one argument datum;
generating a request object;
checking said request object against the stored sets of operation rules using the rule engine; and
performing the following in the event it is determined based on said checking that said request object is permitted:
generating a query to the database;
obtaining data from said database by submitting said query;
building a response data entity;
generating a response object;
generating response data while utilizing said rule engine; and
transmitting said response data to said client.

24. The method of claim 23 wherein said receiving said request further comprises receiving a function name and zero or more function arguments.

25. The method of claim 23 wherein said receiving said request further comprises receiving an alias associated with said web service.

26. The method of claim 23 wherein said receiving said request further comprises determining whether said request requires dynamic handling.

27. The method of claim 23 wherein said receiving said request further comprises examining a header contained in said request, said header bearing information for requesting access to said web service.

28. The method of claim 23 wherein said request object further comprises a data structure for storing request information contained in said request.

29. The method of claim 28 wherein said request object further comprises at least one function for accessing and manipulating said request information.

30. The method of claim 23 wherein said performing said checking further comprises verifying a name of said web service.

31. The method of claim 23 wherein said performing said checking further comprises verifying a type for said at least one argument datum.

32. The method of claim 23 wherein said building said response data entity further comprises generating said data entity using Web Services Description Language.

* * * * *